(12) United States Patent
Saito et al.

(10) Patent No.: US 9,052,839 B2
(45) Date of Patent: Jun. 9, 2015

(54) VIRTUAL STORAGE APPARATUS PROVIDING A PLURALITY OF REAL STORAGE APPARATUSES

(71) Applicant: HITACHI, LTD., Tokyo (JP)

(72) Inventors: Hideo Saito, Kawasaki (JP); Hirotaka Nakagawa, Sagamihara (JP); Yoichi Goto, Yokohama (JP); Abhishek Johri, Yokohama (IN); Tomohiro Kawaguchi, Chigasaki (JP); Kunihiko Nashimoto, Ninomiya (JP); Nobuhito Mori, Kawasaki (JP); Naoko Ikegaya, Sagamihara (JP); Akira Yamamoto, Sagamihara (JP)

(73) Assignee: HITACHI, LTD., Tokyo (JP)

( * ) Notice: Subject to any disclaimer, the term of this patent is extended or adjusted under 35 U.S.C. 154(b) by 251 days.

(21) Appl. No.: 13/812,742

(22) PCT Filed: Jan. 11, 2013

(86) PCT No.: PCT/JP2013/000087
§ 371 (c)(1),
(2) Date: Jan. 28, 2013

(87) PCT Pub. No.: WO2014/108935
PCT Pub. Date: Jul. 17, 2014

(65) Prior Publication Data
US 2014/0201438 A1 Jul. 17, 2014

(51) Int. Cl.
*G06F 12/08* (2006.01)
*G06F 3/06* (2006.01)
(52) U.S. Cl.
CPC .......... *G06F 3/0665* (2013.01); *G06F 12/0866* (2013.01); *G06F 3/0619* (2013.01); *G06F 3/067* (2013.01); *G06F 3/0605* (2013.01); *G06F 3/0644* (2013.01); *G06F 3/0659* (2013.01)
(58) Field of Classification Search
CPC ... G06F 3/0644; G06F 3/0662; G06F 3/0664; G06F 12/0866
USPC ........................................................ 711/170
See application file for complete search history.

(56) References Cited

U.S. PATENT DOCUMENTS

| 2005/0060507 A1 | 3/2005 | Kasako et al. |
| 2005/0114599 A1 | 5/2005 | Kasako et al. |

(Continued)

FOREIGN PATENT DOCUMENTS

| EP | 1 517 241 A2 | 3/2005 |
| EP | 2 104 028 A2 | 9/2009 |

*Primary Examiner* — Hal Schnee
(74) *Attorney, Agent, or Firm* — Volpe and Koenig, P.C.

(57) ABSTRACT

An example is a method of controlling a storage system for providing a virtual storage apparatus that includes virtual storage resources associated with real storage resources of real storage apparatus. It includes receiving a virtual storage resource control command of a predetermined type specifying a first virtual storage resource in the virtual storage apparatus and a second virtual storage resource associated with the first virtual storage resource; referring to management information for managing association relations between the virtual storage resources and the real storage resources, to identify a first real storage resource associated with the first virtual storage resource and a first real storage apparatus including the first real storage resource; and selecting a second real storage resource associated with the second virtual storage resource from real storage resources within the first real storage apparatus, or creating the second real storage resource within the first real storage apparatus.

7 Claims, 25 Drawing Sheets

(56) References Cited

U.S. PATENT DOCUMENTS

| | | |
|---|---|---|
| 2005/0138313 A1 | 6/2005 | Kasako et al. |
| 2006/0112245 A1* | 5/2006 | Ikegaya et al. .............. 711/163 |
| 2006/0282636 A1* | 12/2006 | Yamamoto et al. .......... 711/170 |
| 2007/0150680 A1 | 6/2007 | Kasako et al. |
| 2007/0192561 A1* | 8/2007 | Satoyama et al. ........... 711/170 |
| 2007/0198800 A1* | 8/2007 | Nashimoto et al. .......... 711/170 |
| 2008/0034005 A1 | 2/2008 | Satoyama et al. |
| 2008/0059732 A1* | 3/2008 | Okada et al. ................. 711/162 |
| 2008/0104443 A1* | 5/2008 | Akutsu et al. ..................... 714/6 |
| 2009/0240880 A1 | 9/2009 | Kawaguchi |
| 2012/0023301 A1 | 1/2012 | Miyagaki |
| 2012/0259961 A1* | 10/2012 | Winokur ....................... 709/223 |
| 2013/0332700 A1* | 12/2013 | Kopylovitz et al. .......... 711/209 |

\* cited by examiner

Fig. 5

POOL CONFIGURATION MANAGEMENT TABLE 210

| REAL POOL # 211 | REAL POOL-VOL # 212 |
|---|---|
| 0 | 100 |
|  | 200 |
| 1 | 0 |

Fig. 6

PAGE ALLOCATION MANAGEMENT TABLE 220

| REAL DP-VOL # 221 | INTRA-DP-VOL PAGE # 222 | REAL POOL-VOL # 223 | INTRA-POO-VOL PAGE # 224 |
|---|---|---|---|
| 300 | 0 | 100 | 0 |
|  | 1 | 200 | 0 |
| 400 | 0 | 100 | 1 |

Fig. 7

VIRTUAL VOL MANAGEMENT TABLE (230)

| VIRTUAL VOL # (231) | REAL STORAGE APPARATUS # (232) | REAL VOL # (233) |
|---|---|---|
| 0 | 0 | 100 |
| 100 | 0 | 200 |
| 200 | 1 | 0 |
| 300 | 1 | 100 |

Fig. 8

VIRTUAL POOL MANAGEMENT TABLE (240)

| VIRTUAL POOL # (241) | REAL STORAGE APPARATUS # (242) | REAL POOL # (243) |
|---|---|---|
| 0 | 0 | 0 |
|  | 1 | 0 |
|  | 1 | 1 |
| 1 | 0 | 1 |

Fig. 15

LOCAL COPY PAIR CONFIGURATION MANAGEMENT TABLE (250)

| REAL PAIR # (251) | REAL PVOL # (252) | REAL SVOL # (253) | PAIR STATE (254) |
|---|---|---|---|
| 0 | 500 | 600 | PAIR |
| 1 | 600 | 700 | PSUS |

Fig. 16

VIRTUAL LOCAL COPY PAIR MANAGEMENT TABLE (260)

| VIRTUAL PAIR # (261) | REAL STORAGE APPARATUS # (262) | REAL PAIR # (263) |
|---|---|---|
| 0 | 0 | 0 |
| 1 | 0 | 1 |
| 2 | 1 | 0 |
| 3 | 1 | 1 |

Fig. 24

VIRTUAL JOURNAL GROUP MANAGEMENT TABLE (820)

| VIRTUAL JNLG # (821) | REAL STORAGE APPARATUS # (822) | REAL JNLG # (823) |
|---|---|---|
| 0 | 0 | 0 |
| | 1 | 0 |
| | 1 | 1 |
| 1 | 0 | 1 |

Fig. 25

VIRTUAL REMOTE COPY PAIR MANAGEMENT TABLE (830)

| VIRTUAL PAIR # (831) | REAL STORAGE APPARATUS # (832) | REAL PAIR # (833) |
|---|---|---|
| 0 | 1 | 0 |
| 1 | 0 | 0 |
| 2 | 0 | 1 |
| 3 | 0 | 2 |

VIRTUAL STORAGE APPARATUS PROVIDING A PLURALITY OF REAL STORAGE APPARATUSES

TECHNICAL FIELD

This invention relates to a storage system, a storage system control method, and a storage system management method.

BACKGROUND ART

The increased data capacity handled by computer systems has brought about an increase in the number of users who own a plurality of real storage apparatuses, and a reduction in storage running cost is wished for. Patent Literature 1 discloses a method with which a plurality of real storage apparatuses can be managed as a virtual storage apparatus. This method virtualizes numbers assigned to resources of real storage apparatuses such as volumes, pairs, and groups so that an administrator sees those numbers as resources of a virtual storage apparatus.

CITATION LIST

Patent Literature

[PTL 1] US 2008/0034005 A1

SUMMARY OF INVENTION

Technical Problem

Patent Literature 1, however, does not disclose a method that enables the administrator of the virtual storage apparatus to run the virtual storage apparatus without being conscious of physical boundaries of the plurality of real storage apparatuses.

Solution to Problem

An aspect of this invention is a storage system for providing a virtual storage apparatus that includes a plurality of virtual storage resources associated with a plurality of real storage resources of a plurality of real storage apparatuses. The plurality of real storage apparatuses include a first real storage apparatus and a second real storage apparatus. The first real storage apparatus receives a virtual storage resource control command of a predetermined type which specifies a first virtual storage resource in the virtual storage apparatus and a second virtual storage resource associated with the first virtual storage resource. The first real storage apparatus refers to management information for managing association relations between the plurality of virtual storage resources and the plurality of real storage resources, to identify a first real storage resource which is associated with the first virtual storage resource and one of the plurality of real storage apparatuses that includes the first real storage resource. When the one of the plurality of real storage apparatus that includes the first real storage resource is the first real storage apparatus, the first real storage apparatus performs one of selecting a second real storage resource which is associated with the second virtual storage resource from real storage resources that belong to the first real storage apparatus, and creating the second real storage resource. When the one of the plurality of real storage apparatus that includes the first real storage resource is the second real storage apparatus, the second real storage apparatus performs one of selecting the second real storage resource from real storage resources that belong to the second real storage apparatus, and creating the second real storage resource following an instruction from the first real storage apparatus.

Advantageous Effects of Invention

According to this invention, a plurality of real storage apparatus can be run without the need for being conscious of physical boundaries, and the storage running cost is accordingly reduced.

BRIEF DESCRIPTION OF DRAWINGS

FIG. 5 is a diagram illustrating conceptually the data configuration of a POOL configuration management table of each storage apparatus in the first embodiment.

FIG. 6 is a diagram illustrating conceptually the data configuration of a page allocation management table of each storage apparatus in the first embodiment.

FIG. 7 is a diagram illustrating conceptually the data configuration of a virtual VOL management table of each storage apparatus in the first embodiment.

FIG. 8 is a diagram illustrating conceptually the data configuration of a virtual POOL management table of each storage apparatus in the first embodiment.

FIG. 15 is a diagram illustrating conceptually the data configuration of a local copy pair configuration management table of each storage apparatus in the second embodiment.

FIG. 16 is a diagram illustrating conceptually the data configuration of a virtual local copy pair management table of each storage apparatus in the second embodiment.

FIG. 24 is a diagram illustrating conceptually the data configuration of a virtual journal group management table of each storage apparatus in the third embodiment.

FIG. 25 is a diagram illustrating conceptually the data configuration of a virtual remote copy pair management table of each storage apparatus in the third embodiment.

DESCRIPTION OF EMBODIMENTS

Embodiments of this invention are described below with reference to the accompanying drawings. It should be noted that the embodiments of this invention are merely an example for carrying out this invention and are not to limit the technical scope of this invention.

The embodiments of this invention described below relates to control of a virtual storage apparatus that is obtained by virtualizing a plurality of real storage apparatuses as one logical storage resource.

The embodiments of this invention disclose methods of running and managing real storage resources that are dispersed among a plurality of real storage apparatuses by using virtualized resource numbers (a provisioning method with the locations of storage drives hidden, a copy-system function running method with the locations of real volumes hidden, and the like). Storage resources are, for example, various volumes, pools, and journal groups as described later.

A virtual storage apparatus receives a management operation (such as provisioning or storage function running) made on a virtualized storage resource, and real storage apparatus determine resource association (mapping) between the virtual storage apparatus and the real storage apparatus that is suited to the management operation. The real storage apparatus determine mapping so that, if possible, I/O or storage function processing is contained within a single real storage apparatus. This prevents processing performance in the virtual storage apparatus from dropping.

A plurality of real storage apparatuses can thus be run without the need for being conscious of physical boundaries, and the storage running cost is accordingly reduced. In the following description, each component is a real component unless it is stated that the component is virtual.

First Embodiment

(1-1) Computer System Configuration in First Embodiment

Figure 1A:
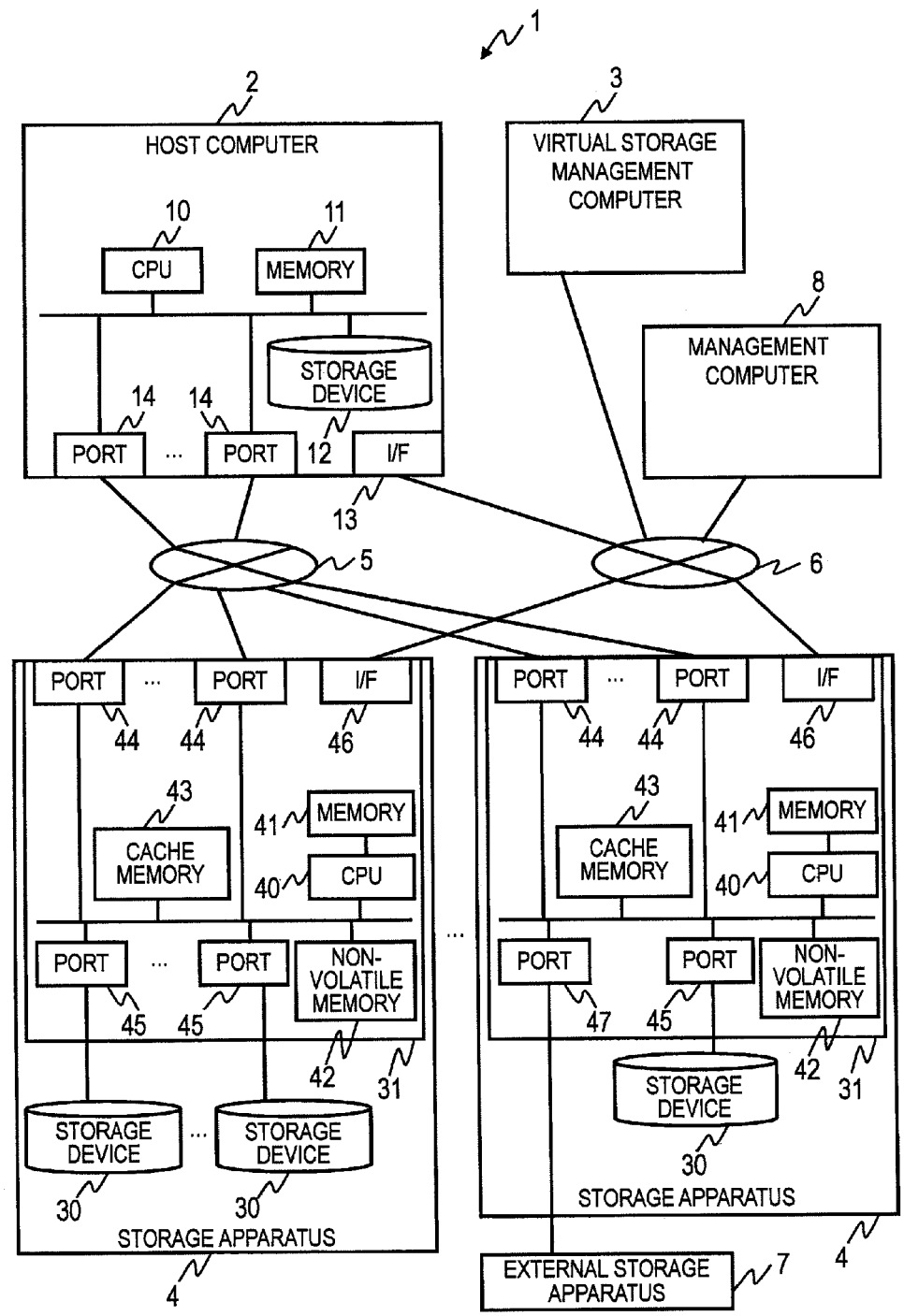
FIG. 1A is a block diagram illustrating the overall configuration of a computer system according to a first embodiment of this invention.

FIG. 1A is a block diagram illustrating the overall configuration of a computer system in a first embodiment of this invention. The computer system which is denoted by 1 includes host computers 2 (only one host computer 2 is illustrated in FIG. 1), a virtual storage management computer 3, management computer 8, at least one storage apparatus 4, a storage area network (SAN) 5, and a local area network (LAN) 6.

The host computer 2 is coupled to each storage apparatus 4 via the SAN 5, and the management computer 3 is coupled to each storage apparatus 4 via the LAN 6.

The host computer 2 includes a CPU 10, a memory 11, a storage device 12, an interface control unit 13 and a plurality of ports 14. The CPU 10 is a processor that handles overall operation control of the host computer 2, reads various programs stored in the memory device 12 onto the memory 11 to execute the programs, and issues an input/output request (access request) which contains a read request or a write request. The memory 11 is used to store various programs read out of the storage device 12 by the CPU 10, and is also used as a work memory of the CPU 10.

The storage device 12 is, for example, a hard disk drive (HDD) or a solid state drive (SSD), and is used to hold various programs and control data. The interface control unit 13 is an adaptor to connect the host computer with the LAN 6. The ports 14 are each an adaptor for coupling the host computer 2 to the SAN 5.

Figure 1B:
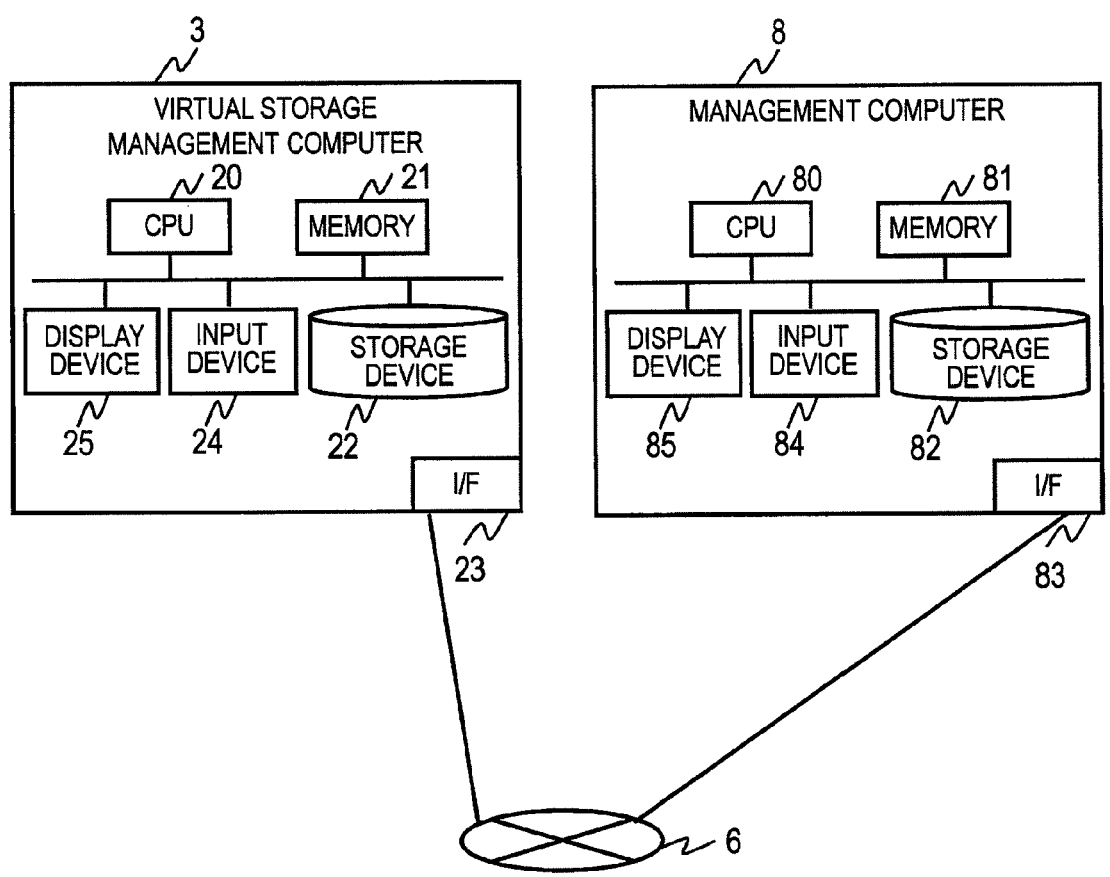
FIG. 1B is a block diagram illustrating the configuration of a virtual storage management computer and a management computer according to the first embodiment of this invention.

FIG. 1B is a block diagram illustrating the configuration of the virtual storage management computer 3 and the management computer 8. The virtual storage management computer 3 is a computer for managing the virtual storage apparatus provided by the storage apparatuses 4, and includes a CPU 20, a memory 21, a storage device 22, an interface control unit 23, an input device 24, and a display device 25. The CPU 20 is a processor that handles the overall operation control of the virtual storage management computer 3, and reads various programs stored in the storage device 22 onto the memory 21 from the storage device 22 to execute the programs. The memory 21 is used to store various programs read out of the storage device 22 by the CPU 20, and is also used as a work memory of the CPU 20.

The storage device 22 is, for example, an HDD or an SSD, and is used to hold various programs and control data. The interface control unit 23 is an adaptor for coupling the management computer 3 to the LAN 6. The input device 24 is constituted of, for example, a keyboard and a mouse. The display device 25 is constituted of, for example, a liquid crystal display.

The management computer 8 is a computer for managing the storage apparatuses 4, and the hardware configuration is the same as the virtual storage management computer 3. Namely, the management computer 8 includes a CPU 80, a memory 81, a storage device 82, an interface control unit 83, an input device 84, and a display device 85. The real resources of the storage apparatuses 4 are managed by the management computer 8. A management system of this configuration example which is constituted of the virtual storage management computer 3 and the management computer 8 may be made up of a plurality of computers. One of the plurality of computers may be for display use, and processing equivalent to that of the virtual storage management computer 3 or the management computer 8 may be implemented by the plurality of computers in order to enhance the speed and reliability of management processing.

Each storage apparatus 4 includes a plurality of storage devices 30 and a control unit 31, which controls input/output of data to/from the storage devices 30. Each storage device 30 is constituted of, for example, an HDD or an SSD. Two or more storage devices out of the plurality of storage devices 30 constitute one RAID group (RAID stands for Redundant Array of Inexpensive Disks), and at least one logical unit is set in a storage area provided by at least one RAID group. Data from the host computer 2 is stored in the logical unit in units of a block of a given size.

The control unit 31 includes a CPU 40, a memory 41, a non-volatile memory 42, a cache memory 43, a plurality of host-side ports 44, a plurality of storage device-side ports 45, and an interface control unit 46. The control unit 31 may include at least one external storage-side port 47 as well.

The CPU 40 is a processor that handles the overall operation control of the storage apparatus 4, and reads various programs stored in the non-volatile memory 42 onto the memory 41 to execute the programs. The memory 41 is used to store various programs read out of the non-volatile memory 42 by the CPU 40, and is also used as a work memory of the CPU 40. The non-volatile memory 42 is used to store and hold various programs and control data.

The cache memory 43 is mainly used to store, on a temporary basis, data exchanged between the host computer 2 and the plurality of storage devices 30. The host-side ports 44 are adaptors for coupling the storage apparatus 4 to the SAN 5. The storage device-side ports 45 are adaptors for connecting the control unit 31 to the storage devices 30. The interface control unit 46 is an adaptor for coupling the storage apparatus 4 to the LAN 6. The external storage-side port 47 is an adaptor for connecting the control unit 31 to an external storage apparatus 7.

Figure 2:
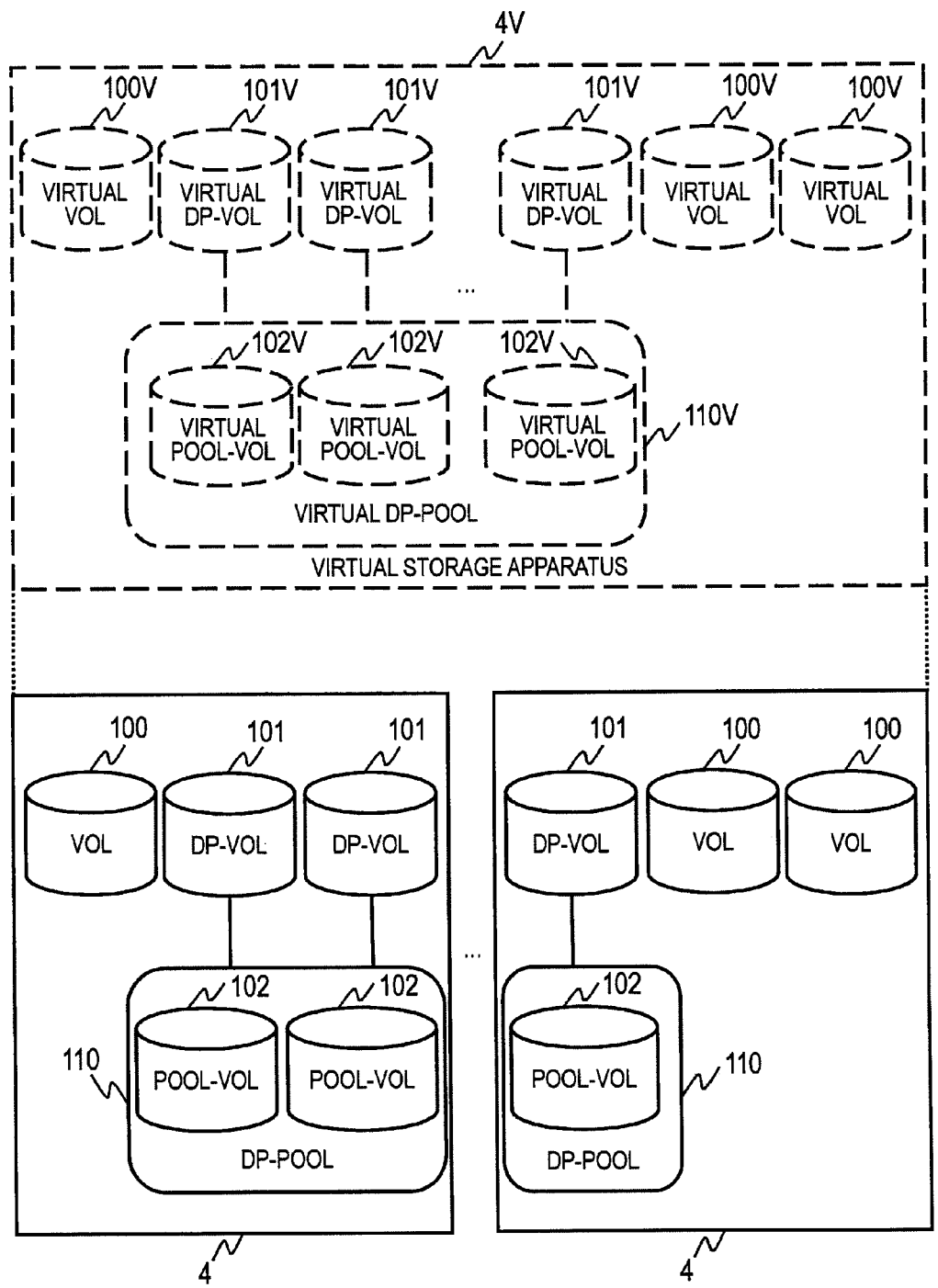
FIG. 2 is a diagram illustrating an association relation between the real configuration and virtual configuration of storage apparatuses in the first embodiment.

FIG. 2 illustrates an association relation between the real configuration of a plurality of storage apparatuses 4 and a virtual configuration provided to the virtual storage management computer 3 by the plurality of storage apparatuses 4. While the real configuration includes a plurality of storage apparatuses 4, the virtual configuration provides one virtual storage apparatus 4V to the virtual storage management computer 3.

In the real configuration, a plurality of logical units (volumes) are set in each storage apparatus 4. There are three types of logical unit, a volume (VOL) 100, a dynamic pool volume (DP-VOL) 101, and a pool volume (POOL-VOL) 102. Each VOL 100 is allocated statically to a storage area provided by a RAID group.

Each DP-VOL 101 is allocated dynamically via one POOL-VOL 102 to a storage area provided by a RAID group. Each POOL-VOL 102 is allocated statically to a storage area provided by a RAID group and serves as the allocation source of at least one DP-VOL 101. The VOLs 100 and the DP-VOLs 101 are provided as input/output target logical units to the host computer 2, whereas the POOL-VOLs 102 are not provided as input/output target logical units to the host computer 2. A storage area provided by a RAID group may be provided directly to a POOL without intervention of a POOL-VOL.

Each storage apparatus 4 manages a DP-POOL 110 which is constituted of at least one POOL-VOL 102. One storage apparatus 4 may manage a plurality of DP-POOLS 110. Each DP-VOL 101, which is not allocated a storage area at the time of creation, is dynamically allocated a storage area from the POOL-VOL 102 included in the DP-POOL 110 when a write request is received from the host computer 2.

In the virtual configuration, at least one virtual VOL 100V, at least one virtual DP-VOL 101V, at least one virtual POOL-VOL 102V, and at least one virtual DP-POOL 110V are set in the virtual storage apparatus 4V.

Each virtual VOL 100V is associated with one of the VOLs 100 on a one-to-one basis. Similarly, each virtual DP-VOL 101V is associated with one of the DP-VOLs 101 on a one-to-one basis, and each virtual POOL-VOL 102V is associated with one of the POOL-VOLs 102 on a one-to-one basis.

Each virtual DP-POOL 110V is associated with at least one DP-POOL 110. A plurality of DP-POOLs 110 set in different storage apparatus 4 may be associated with one virtual DP-POOL 110V. Each virtual DP-POOL 110V has as a component the virtual POOL-VOL 102V associated with the POOL-VOL 102 that constitutes any DP-POOL 110 associated with the virtual DP-POOL 110V. This enables the virtual storage management computer 3 to manage a plurality of DP-POOLs 110 as one virtual DP-POOL.

Figure 3:
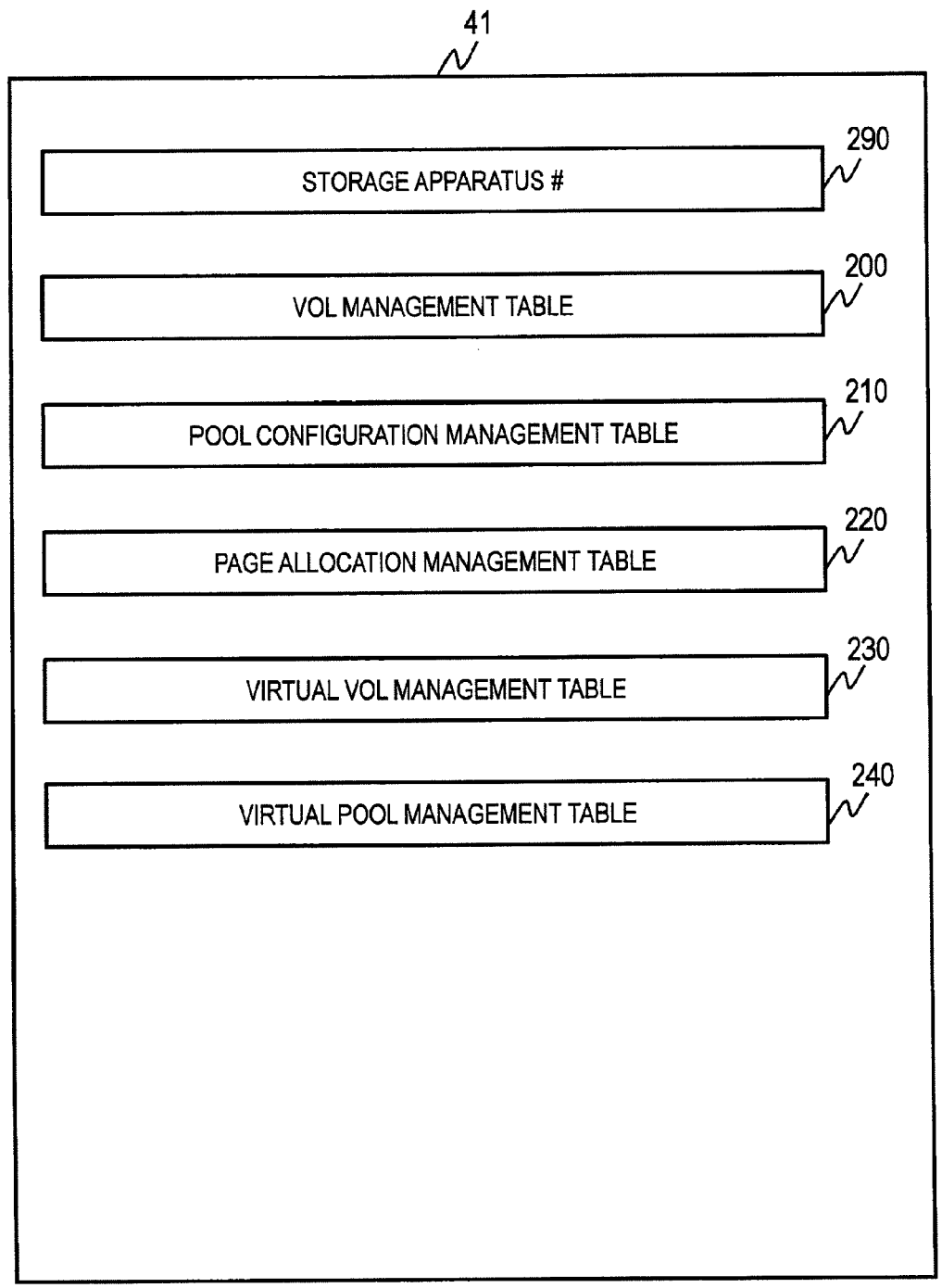
FIG. 3 is a diagram illustrating conceptually a data configuration in a memory of each storage apparatus in the first embodiment.

FIG. 3 illustrates main configuration information stored in the memory 41 of each storage apparatus 4. As illustrated in FIG. 3, the memory 41 stores a storage apparatus #290, a VOL management table 200, a POOL configuration management table 210, a page allocation management table 220, a virtual VOL management table 230, and a virtual POOL management table 240.

The storage apparatus #290 is a number used to uniquely identify each storage apparatus 4 that constitutes the virtual storage apparatus 4V. The VOL management table 200, the POOL configuration management table 210, and the page allocation management table 220 are local tables for storing information unique to each storage apparatus.

The virtual VOL management table 230 and the virtual POOL management table 240 are tables common to all virtual storage apparatus 4V that provide real storage resources to the virtual storage apparatus 4V. When the virtual VOL management table 230 or the virtual POOL management table 240 is updated in one of the storage apparatus, the rest of the storage apparatuses 4 are notified of the update and update the table themselves.

The count of tables storing necessary information and the configurations of the respective tables depend on design. The information does not depend on what data structure is employed and information used by the system can be expressed in any data structure. Other than being stored in tables as described below, the information may be stored in a data structure selected appropriately from among, for example, the list format, the database format, and the queue format. Terms used in describing the specifics of each piece of the information, such as "identification information", "identifier", "name", "ID", and "number", can be substituted by one another.

Figure 4:
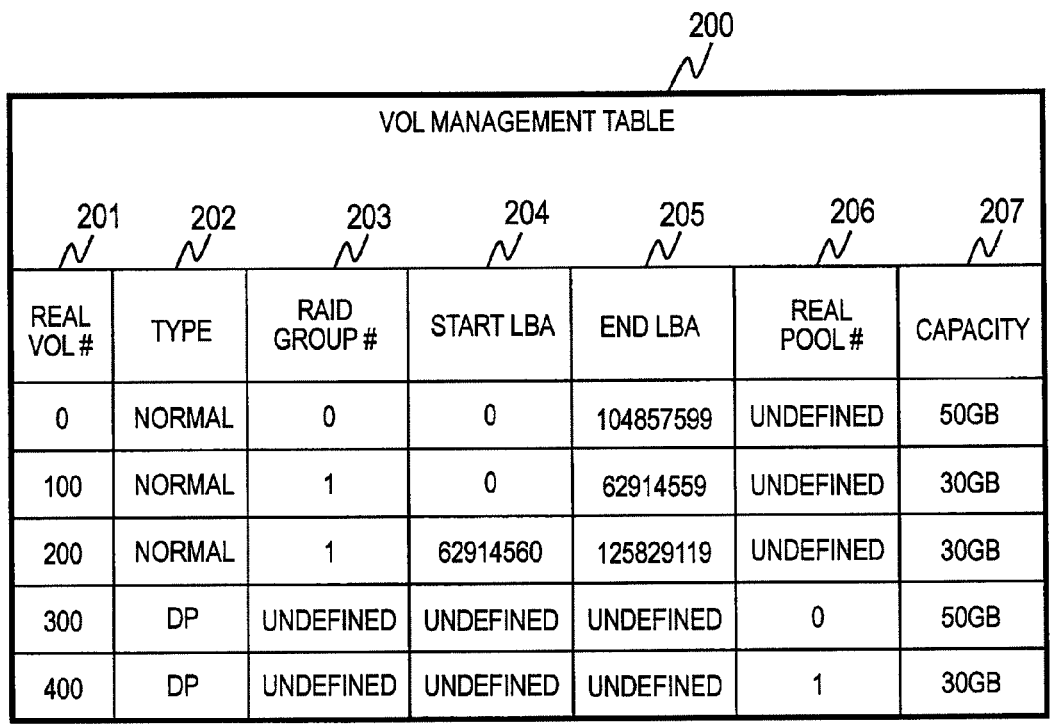
FIG. 4 is a diagram illustrating conceptually the data configuration of a VOL management table of each storage apparatus in the first embodiment.

FIG. 4 illustrates a configuration example of the VOL management table 200. The CPU 40 of each storage apparatus 4 uses the VOL management table 200 to manage information about every real logical unit (VOL 100, DP-VOL 101, and POOL-VOL 102) within the casing of its own storage apparatus 4. Registered in the VOL management table 200 for each logical unit are, for example, a real VOL #201, a type 202, a RAID group #203, a start LBA 204, an end LBA 205, a real POOL #206, and a capacity 207.

The real VOL #201 is a number used to identify each logical unit uniquely throughout the storage apparatuses 4.

The type 202 is information indicating the type of a logical unit that is identified by the real VOL #201, and has a value "normal" or "DP". When the type 202 is "normal", a logical unit identified by the real VOL #201 is allocated statically to a storage area provided by a RAID group (one of the VOLs 110 or one of the POOL-VOLs 102). When the type 202 is "DP", on the other hand, a logical unit identified by the real VOL #201 is allocated dynamically to a storage area provided by a RAID group (one of the DP-VOLs 101).

The RAID group #203 is information utilized when the type 202 is "normal", and is used to identify, uniquely throughout the storage apparatuses 4, a RAID group that stores data of the logical unit (one of the VOLs 110 or one of the POOL-VOLs 102) identified by the real VOL #201. The RAID group #203 is undefined when the type 202 is "DP".

The start LBA 204 is information utilized when the type 202 is "normal", and indicates the start logical block address (LBA) of a storage area that is used by a logical unit (one of the VOLs 110 or one of the POOL-VOLs 102) identified by the real VOL #201 to store data in a RAID group identified by the RAID group #203. The start LBA 204 is undefined when the type 202 is "DP".

The end LBA 205 is information utilized when the type 202 is "normal", and indicates the end LBA of a storage area that is used by a logical unit (one of the VOLs 110 or one of the POOL-VOLs 102) identified by the real VOL #201 to store data in a RAID group identified by the RAID group #203. The end LBA 205 is undefined when the type 202 is "DP".

The real POOL #206 is information utilized when the type 202 is "DP", and is used to identify, uniquely throughout the storage apparatuses 4, the DP-POOL 110 that stores data of a logical unit (one of the DP-VOLs 101) identified by the real VOL #201. The real POOL #206 is undefined when the type 202 is "normal".

The capacity 207 is information indicating the capacity of a logical unit that is identified by the real VOL #201.

FIG. 5 illustrates a configuration example of the POOL configuration management table 210. The CPU 40 of each storage apparatus 4 uses the POOL configuration management table 210 to manage information about every DP-POOL 110 within the casing of its own storage apparatus 4. Registered in the POOL configuration management table 210 for each DP-POOL 110 are, for example, a real POOL #211 and at least one real POOL-VOL #212.

The real POOL #211 is a number used to identify each DP-POOL 110 uniquely throughout the storage apparatuses 4.

The real POOL-VOL #212 is a number used to identify, uniquely throughout the storage apparatuses 4, each POOL-VOL 102 that constitutes the DP-POOL 110 identified by the real POOL #211. A real POOL-VOL # is a real VOL # assigned to a real POOL-VOL. At least one real POOL-VOL #212 is associated with one real POOL #211.

FIG. 6 illustrates the data configuration of the page allocation management table 220. The CPU 40 of each storage apparatus 4 uses the page allocation management table 220 to manage, for every DP-VOL 101 within the casing of its own storage apparatus 4, page allocation to the DP-VOL 101 from the POOL-VOLs 102.

A page is a continuous storage area having a size of, for example, 1 MB or 1 GB. Registered in the page allocation management table 220 for each DP-VOL 101 are, for example, a real DP-VOL #221, at least one intra-DP-VOL page #222, at least one real POOL-VOL #223, and at least one intra-POOL-VOL page #224.

The real DP-VOL #221 is a number used to identify each DP-VOL 101 uniquely throughout the storage apparatuses 4. A real DP-VOL # is a real VOL # assigned to a real DP-VOL, and the real DP-VOL #221 corresponds to the real VOL #201 of the VOL management table 200.

The intra-DP-VOL page #222 is a number used to uniquely identify a page within each DP-VOL 101.

The real POOL-VOL #223 is a number used to identify, uniquely throughout the storage apparatuses 4, the POOL-VOL 110 that holds a storage area allocated to a page that is identified by the intra-DP-VOL page #222. The real POOL-VOL #223 corresponds to the real VOL #201 of the VOL management table 200.

The intra-POOL-VOL page #224 is a number used to uniquely identify a page within the POOL-VOL 110 that is allocated to a page identified by the intra-DP-VOL page #222.

FIG. 7 illustrates the data configuration of the virtual VOL management table 230. The CPU 40 of each storage apparatus 4 uses the virtual VOL management table 230 to manage, for every virtual VOL 100V, virtual DP-VOL 101V, and virtual POOL-VOL 102V within the virtual storage apparatus 4V, information about the association of the virtual VOL 100V, the virtual DP-VOL 101V, or the virtual POOL-VOL 102V with one of the VOLs 100. Registered in the virtual VOL management table 230 are, for example, a virtual VOL #231, a real storage apparatus #232, and a real VOL #233.

The virtual VOL #231 is a number used to identify each virtual VOL 100V, each virtual DP-VOL 101V, or each virtual POOL-VOL 102V uniquely throughout the virtual storage apparatus 4V.

The real storage apparatus #232 is a number used to uniquely identify the storage apparatus 4 where the VOL 100, the DP-VOL 101, or the POOL-VOL 102 that is associated with the virtual VOL 100V, the virtual DP-VOL 101V, or the virtual POOL-VOL 102V that is identified by the virtual VOL #231 is located.

The real VOL #233 is a number used to identify, uniquely throughout the storage apparatuses 4 identified by the real storage apparatus #232, the VOL 100, the DP-VOL 101, or the POOL-VOL 102 that is associated with the virtual VOL 100V, the virtual DP-VOL 101V, or the virtual POOL-VOL 102V that is identified by the virtual VOL #231. The real VOL #233 corresponds to the real VOL #201 of the VOL management table 200.

FIG. 8 illustrates a configuration example of the virtual POOL management table 240. The CPU 40 of each storage apparatus 4 uses the virtual POOL management table 240 to manage, for every virtual DP-POOL 110V within the virtual storage apparatus 4V, information about the association of the virtual DP-POOL 110V with one of the DP-POOLs 110. Registered in the virtual POOL management table 240 are, for example, a virtual POOL #241, a real storage apparatus #242, and a real POOL #243.

The virtual POOL #241 is a number used to identify each virtual DP-POOL 110V uniquely throughout the virtual storage apparatus 4V. The real storage apparatus #242 is a number used to uniquely identify the storage apparatus 4 where the DP-POOL 110V that is associated with the virtual DP-POOL 110V identified by the virtual POOL #241 is located.

The real POOL #243 is a number used to identify, uniquely throughout the storage apparatuses 4 identified by the real storage apparatus #242, the DP-POOL 110 that is associated with the virtual DP-POOL 110V identified by the virtual POOL #241. The real POOL #243 corresponds to the real POOL #211 of the POOL configuration management table 210.

(1-2) Capacity Pool Constructing Processing in this Embodiment

Figure 9:
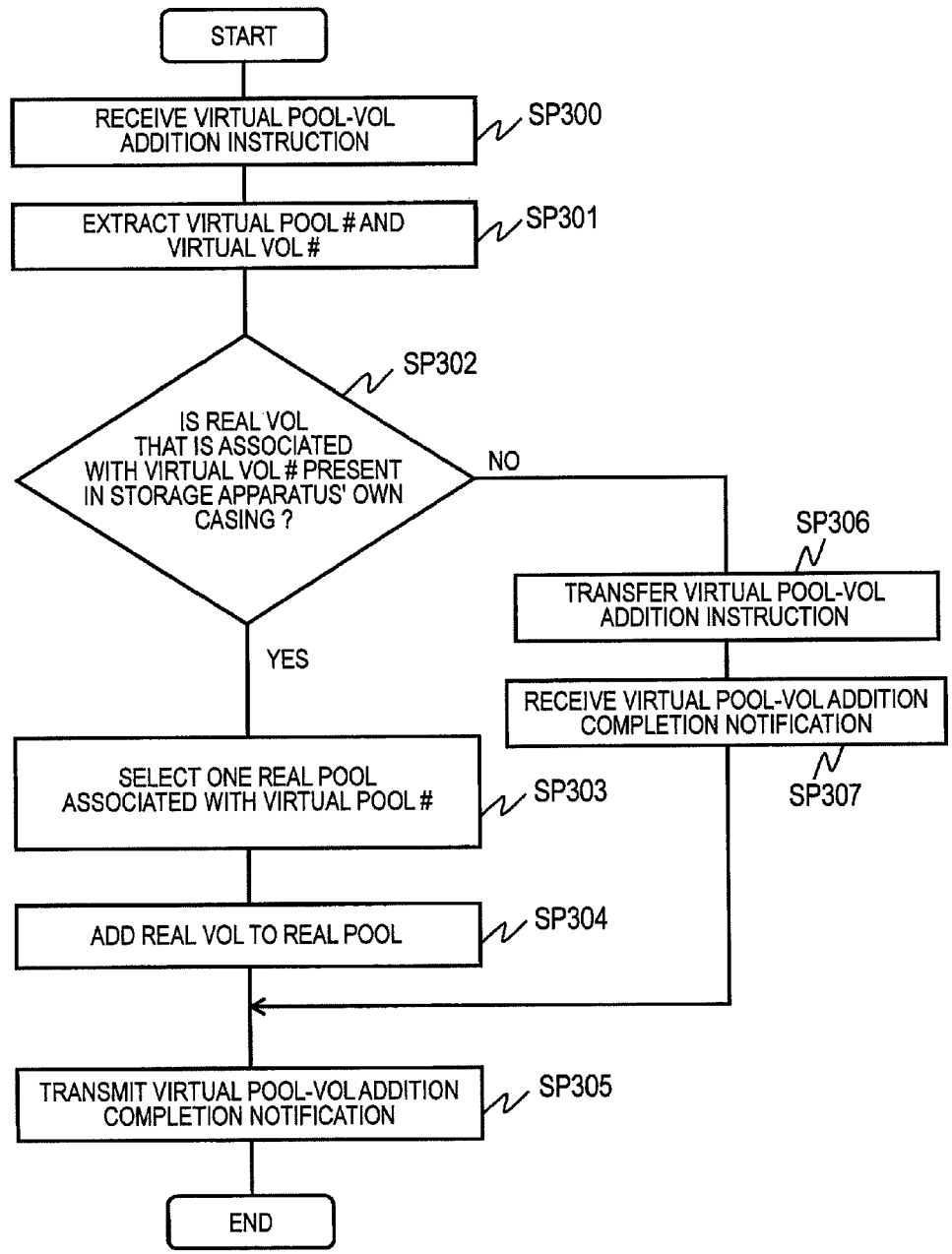
FIG. 9 is a flow chart illustrating steps of POOL-VOL adding processing of the storage apparatus in the first embodiment.

Capacity pool constructing processing executed in the computer system 1 is described below. In the following description, letters "SP" prefixed to a reference numeral mean "step". FIG. 9 is a flow chart illustrating processing that is executed by one of the storage apparatus 4 that receives a virtual POOL-VOL addition instruction from the virtual storage management computer 3 (hereinafter referred to as virtual POOL-VOL adding processing A). The virtual storage management computer 3 recognizes the provided virtual storage apparatus 4V as described above. The POOL-VOL addition instruction from the virtual storage management computer 3 here is an instruction to add a virtual POOL-VOL to the virtual storage apparatus 4V.

The virtual POOL-VOL adding processing A is implemented by the CPU 40 of the storage apparatus 4 by executing a program. The storage apparatus 4 receives a virtual POOL-VOL addition instruction from the virtual storage management computer 3 (SP300), and first extracts a virtual POOL # and a virtual VOL # from the virtual POOL-VOL addition instruction (SP301).

The storage apparatus 4 next determines whether or not the VOL 100 that is associated with the virtual VOL # extracted in Step SP301 is present in its own casing (SP302). Specifically, the storage apparatus 4 refers to the virtual VOL management table 230 to identify an entry in which the same value as the virtual VOL # extracted in Step SP301 is set to the virtual VOL #231, and determines whether or not the real storage apparatus #232 of the identified entry matches the storage apparatus #290.

When the result of this determination is positive (SP302: YES), the storage apparatus 4 proceeds to Step SP303 to select one DP-POOL 110 that is associated with the virtual POOL # extracted in Step SP301 and that is present in its own casing. Specifically, the storage apparatus 4 refers to the virtual POOL management table 240 to identify an entry in which the same value as the virtual POOL # extracted in Step SP301 is set to the virtual POOL #241, and selects one sub-entry in the identified entry where the same value as the storage apparatus #290 is set to the real storage apparatus #242.

The storage apparatus 4 next adds the VOL 100 that is associated with the virtual VOL # extracted in Step SP301 to the DP-POOL 110 that is associated with the real POOL #243 of the sub-entry selected in Step SP303 (SP304).

Specifically, the storage apparatus 4 refers to the virtual VOL management table 230 to identify an entry in which the same value as the virtual VOL # extracted in Step SP301 is set to the virtual VOL #231, and extracts the real VOL #233 from the identified entry. The storage apparatus 4 then updates the POOL configuration management table 210 by adding the extracted VOL #233 to an entry in which the same value as the real POOL #243 of the sub-entry selected in Step SP303 is set to the real POOL #211.

Lastly, the storage apparatus 4 transmits a virtual POOL-VOL addition completion notification to the virtual storage management computer 3 (SP305), and ends the virtual POOL-VOL adding processing A.

In the case where the result of the determination of Step SP302 is negative (SP302: NO), on the other hand, the storage apparatus 4 proceeds to Step SP306 to transfer the virtual POOL-VOL addition instruction to the storage apparatus 4 where the VOL 100 that is associated with the virtual VOL # extracted in Step SP301 is located. Specifically, the storage apparatus 4 transmits the virtual POOL-VOL addition instruction to the storage apparatus 4 that is associated with the real storage apparatus #232 of the entry identified in Step SP302.

The storage apparatus 4 to which the virtual POOL-VOL addition instruction has been transferred executes Steps SP300 to SP305. In Step SP300, however, the storage apparatus 4 to which the virtual POOL-VOL addition instruction has been transferred receives a virtual POOL-VOL addition instruction from the storage apparatus 4 that has transferred the virtual POOL-VOL addition instruction, instead of from the virtual storage management computer 3. In addition, the storage apparatus 4 to which the virtual POOL-VOL addition instruction has been transferred always obtains a positive result in the determination of Step SP302.

Further, in Step SP305, the storage apparatus 4 to which the virtual POOL-VOL addition instruction has been transferred transmits a virtual POOL-VOL addition completion notification to the storage apparatus 4 that has transferred the virtual POOL-VOL addition instruction, instead of to the virtual storage management computer 3.

The storage apparatus 4 that has transferred the virtual POOL-VOL addition instruction receives the virtual POOL-VOL addition completion notification from the storage apparatus 4 to which the virtual POOL-VOL addition instruction has been transferred (SP307), and proceeds to Step SP305.

The flow described above makes it possible to construct within the same storage apparatus 4 a real POOL that is associated with a virtual POOL to which a virtual POOL-VOL is to be added and a real POOL-VOL that is associated with the virtual POOL-VOL to be added, thereby avoiding additional processing that is caused by communication between one storage apparatus 4 and another.

(1-3) Volume Provisioning Processing in this Embodiment

Volume provisioning processing executed in the computer system 1 is described below. In the following description, letters "SP" prefixed to a reference numeral mean "processing step".

Figure 10:
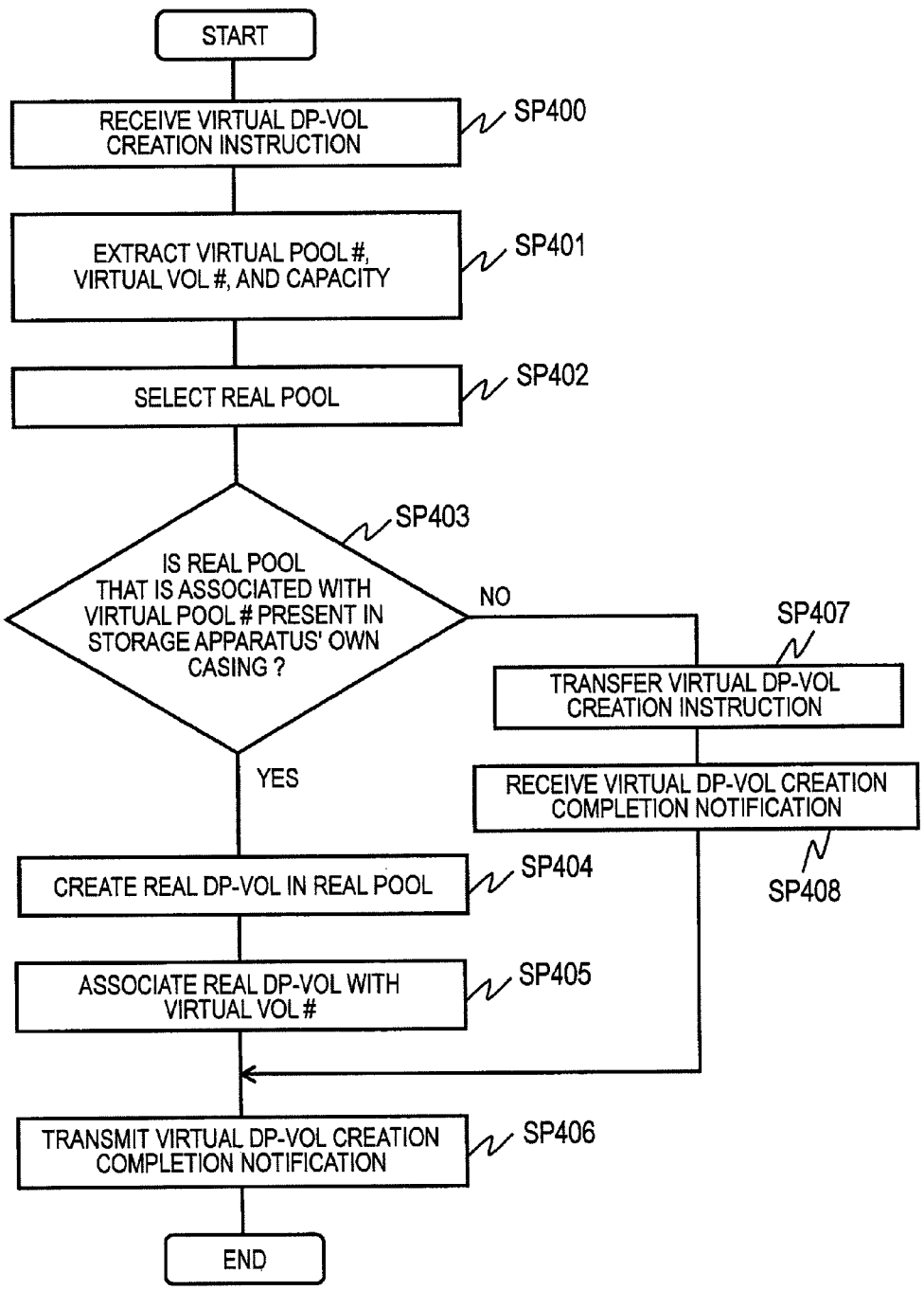
FIG. 10 is a flow chart illustrating steps of DP-VOL creating processing of the storage apparatus in the first embodiment.

FIG. 10 is a flow chart illustrating processing that is executed by one of the storage apparatus 4 that receives a virtual DP-VOL creation instruction from the virtual storage management computer 3 (hereinafter referred to as virtual DP-VOL creating processing A). The virtual DP-VOL creating processing A is implemented by the CPU 40 of the storage apparatus 4 by executing a program.

The storage apparatus 4 receives the virtual DP-VOL creation instruction from the virtual storage management computer 3 (SP400), and first extracts a virtual POOL #, a virtual VOL #, and a capacity from the virtual DP-VOL creation instruction (SP401).

The storage apparatus 4 next selects one DP-POOL 110 that is associated with the virtual POOL # extracted in Step SP401 (SP402). Specifically, the storage apparatus 4 refers to the virtual POOL management table 240 to identify an entry in which, the same value as the virtual POOL # extracted in Step SP401 is set to the virtual POOL #241, and selects one sub-entry in the identified entry.

The storage apparatus 4 next determines whether or not the DP-POOL 110 selected in Step SP402 is present in its own casing (SP403). Specifically, the storage apparatus 4 determines whether or not the real storage apparatus #242 of the sub-entry selected in Step SP402 matches the storage apparatus #290.

When the result of this determination is positive (SP403: YES), the storage apparatus 4 proceeds to Step SP404 to create a new DP-VOL 101 in the DP-POOL 110 selected in Step SP402.

Specifically, the storage apparatus 4 adds one entry to the VOL management table 200. In the added entry, a number that is not used in any other entry is set to the real VOL #201, "DP"

is set to the type 202, the real POOL #243 of the sub-entry selected in step SP402 is set to the real POOL #206, and the capacity extracted in Step SP401 is set to the capacity 207. The RAID group #203, the start LBA 204, and the end LBA 205 are left undefined.

The storage apparatus 4 next associates the DP-VOL 101 created in Step SP404 with the virtual VOL # extracted in Step SP401 (SP405). Specifically, the storage apparatus 4 adds one entry to the virtual VOL management table 230. In the added entry, the virtual VOL # extracted in Step SP401 is set to the virtual VOL #231, the storage apparatus #290 is set to the real storage apparatus #232, and the number set to the real VOL #201 in Step SP404 is set to the real VOL #233.

The storage apparatus 4 also transmits to all other storage apparatus 4 an instruction to update their respective virtual VOL management tables 230. Receiving the instruction, each storage apparatus 4 adds one entry to the virtual VOL management table 230 in the same way as the storage apparatus 4 that has transmitted the instruction.

Lastly, the storage apparatus 4 transmits a virtual DP-VOL creation completion notification to the virtual storage management computer 3 (SP406), and ends the virtual DP-VOL creating processing A.

In the case where the result of the determination of Step SP403 is negative (SP403: NO), on the other hand, the storage apparatus 4 proceeds to Step SP407 to transfer the virtual DP-VOL creation instruction to the storage apparatus 4 where the DP-POOL 110 selected in Step SP402 is located.

Specifically, the storage apparatus 4 transfers the virtual DP-VOL creation instruction to the storage apparatus 4 that is associated with the real storage apparatus #242 of the sub-entry selected in Step SP402. When transferring the instruction, the storage apparatus 4 includes in the virtual DP-VOL creation instruction the virtual POOL #, virtual VOL #, and capacity specified by the virtual storage management computer 3, and a real POOL # of the sub-entry selected in Step SP402 as well. The transferred virtual DP-VOL creation instruction may not include the virtual POOL #.

The storage apparatus 4 to which the virtual DP-VOL creation instruction has been transferred executes Step SP400 and Steps SP404 to SP406. In Step SP400, however, the storage apparatus 4 to which the virtual DP-VOL creation instruction has been transferred receives a virtual DP-VOL creation instruction from the storage apparatus 4 that has transferred the virtual DP-VOL creation instruction, instead of from the virtual storage management computer 3.

Before executing Step SP404, the storage apparatus 4 to which the virtual DP-VOL creation instruction has been transferred extracts a virtual VOL #, a capacity, and a real POOL # from the transferred virtual DP-VOL creation instruction. In Step SP404, the storage apparatus 4 to which the virtual DP-VOL creation instruction has been transferred sets the real POOL # included in the transferred virtual DP-VOL creation instruction to the real POOL #206.

Step SP405 is as described above. In Step SP406, the storage apparatus 4 to which the virtual DP-VOL creation instruction has been transferred transmits a virtual DP-VOL creation completion notification to the storage apparatus 4 that has transferred the virtual DP-VOL creation instruction, instead of to the virtual storage management computer 3.

The storage apparatus 4 that has transferred the virtual DP-VOL creation instruction receives the virtual DP-VOL creation completion notification from the storage apparatus 4 to which the virtual DP-VOL creation instruction has been transferred (SP408), and proceeds to Step SP406.

The flow described above makes it possible to construct within the same storage apparatus 4 a real POOL that is associated with a virtual POOL from which a virtual DP-VOL is to be created and a real DP-VOL that is associated with the virtual DP-VOL to be created, thereby avoiding additional processing that is caused by communication between one storage apparatus 4 and another.

(1-4) the Configuration and Processing for the Case where the Management Computer Takes Initiative The capacity pool constructing processing and the volume provisioning processing in which the relevant storage apparatus 4 takes a central role in the description given above may be initiated and conducted by the management computer 8.

In the case where the management computer 8 initiates and conducts the processing, the management computer 8 holds the virtual VOL management table 230 and the virtual POOL management table 240 in the memory 81, and keeps the tables consistent with the virtual VOL management table 230 and the virtual POOL management table 240 that each storage apparatus 4 holds in the memory 41.

Figure 11:
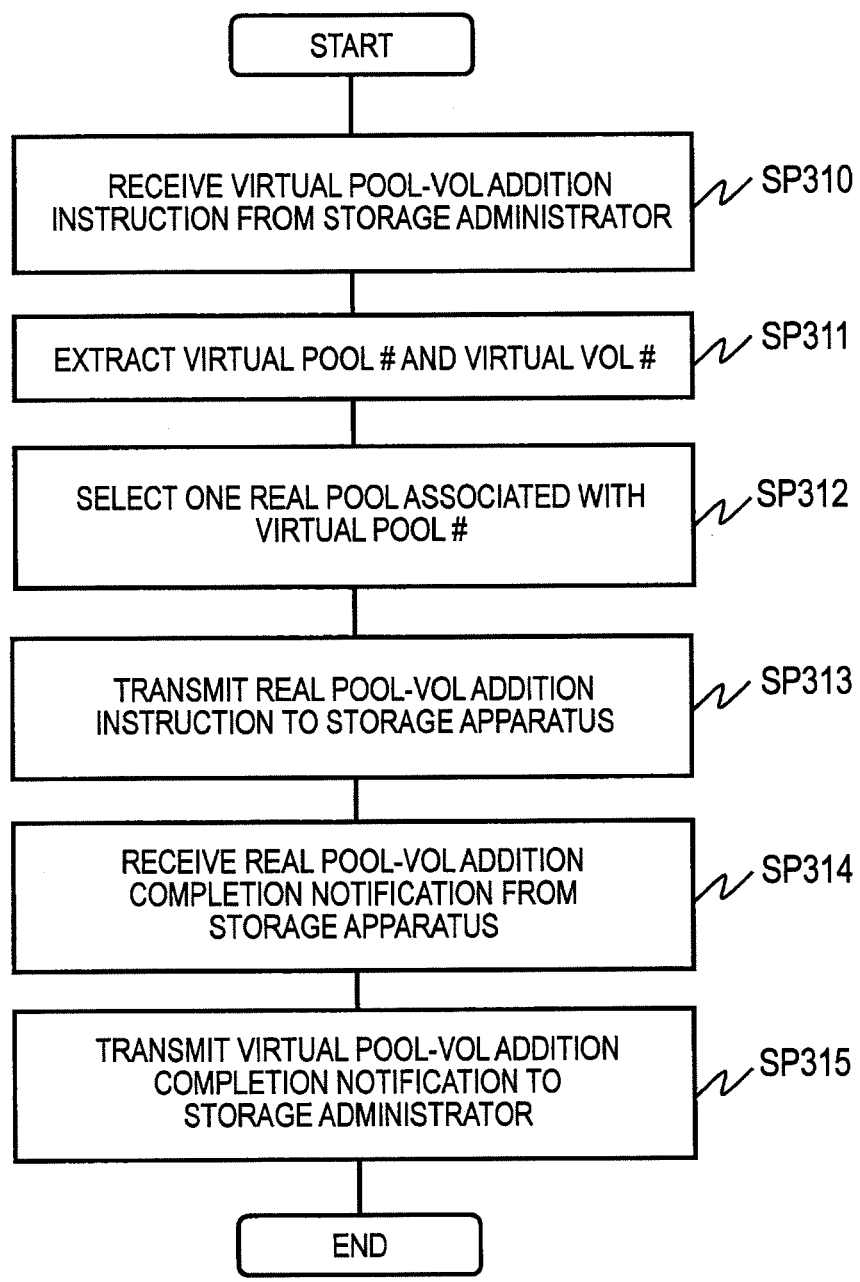
FIG. 11 is a flow chart illustrating steps of POOL-VOL adding processing that is initiated and conducted by a management computer in the first embodiment.

FIG. 11 is a flow chart illustrating processing that is executed by the management computer 8 when a virtual POOL-VOL addition instruction is received from a virtual storage administrator (hereinafter referred to as virtual POOL-VOL addition processing B). The virtual storage administrator, for example, sends the instruction using the virtual management computer 3. The virtual POOL-VOL addition processing B is implemented by the CPU 80 of the management computer 8 by executing a program. This may lessen the load on the storage apparatus 4.

The management computer 8 receives a virtual POOL-VOL addition instruction from the virtual storage administrator (SP310), and first extracts a virtual POOL # and a virtual VOL # from the virtual POOL-VOL addition instruction (SP311).

The management computer 8 next selects one DP-POOL 110 that is associated with the virtual POOL # extracted in Step SP311 and that is present in the same casing (the same storage apparatus 4) as the VOL 100 that is associated with the virtual VOL # extracted in Step SP311 (SP312).

Specifically, the management computer 8 refers to the virtual POOL management table 240 of the memory 81 to identify an entry in which the same value as the virtual POOL # extracted in Step SP311 is set to the virtual POOL #241.

The management computer 8 also refers to the virtual VOL management table 230 of the memory 81 to identify an entry in which the same value as the virtual VOL # extracted in Step SP311 is set to the virtual VOL #231, and extracts the real storage apparatus #232 from the identified entry. The management computer 8 then selects one sub-entry in the identified entry of the virtual POOL management table 240 where the same value as the extracted real storage apparatus #232 is set to the real storage apparatus #242.

The management computer 8 next transmits a real POOL-VOL addition instruction to the storage apparatus 4 where the DP-POOL 110 selected in Step SP312 is located (SP313). Specifically, the management computer 8 transmits a real POOL-VOL addition instruction to the storage apparatus 4 that is associated with the real storage apparatus #242 of the sub-entry selected in Step SP312. When transmitting the instruction, the management computer 8 includes in the real POOL-VOL addition instruction the real POOL #243 of the sub-entry selected in Step SP312 and the real VOL #233 of the entry of the virtual VOL management table 230 that has been identified in Step SP312.

The storage apparatus 4 that has received the real POOL-VOL addition instruction adds the specified VOL 100 to the specified DP-POOL 110 following the real POOL-VOL addition instruction, and transmits a real POOL-VOL addition completion notification to the management computer 8.

The management computer 8 receives the real POOL-VOL addition completion notification from the storage apparatus 4 (SP314), transmits a virtual POOL-VOL addition completion notification to the virtual storage administrator (SP315), and ends the virtual POOL-VOL adding processing B.

Figure 12:
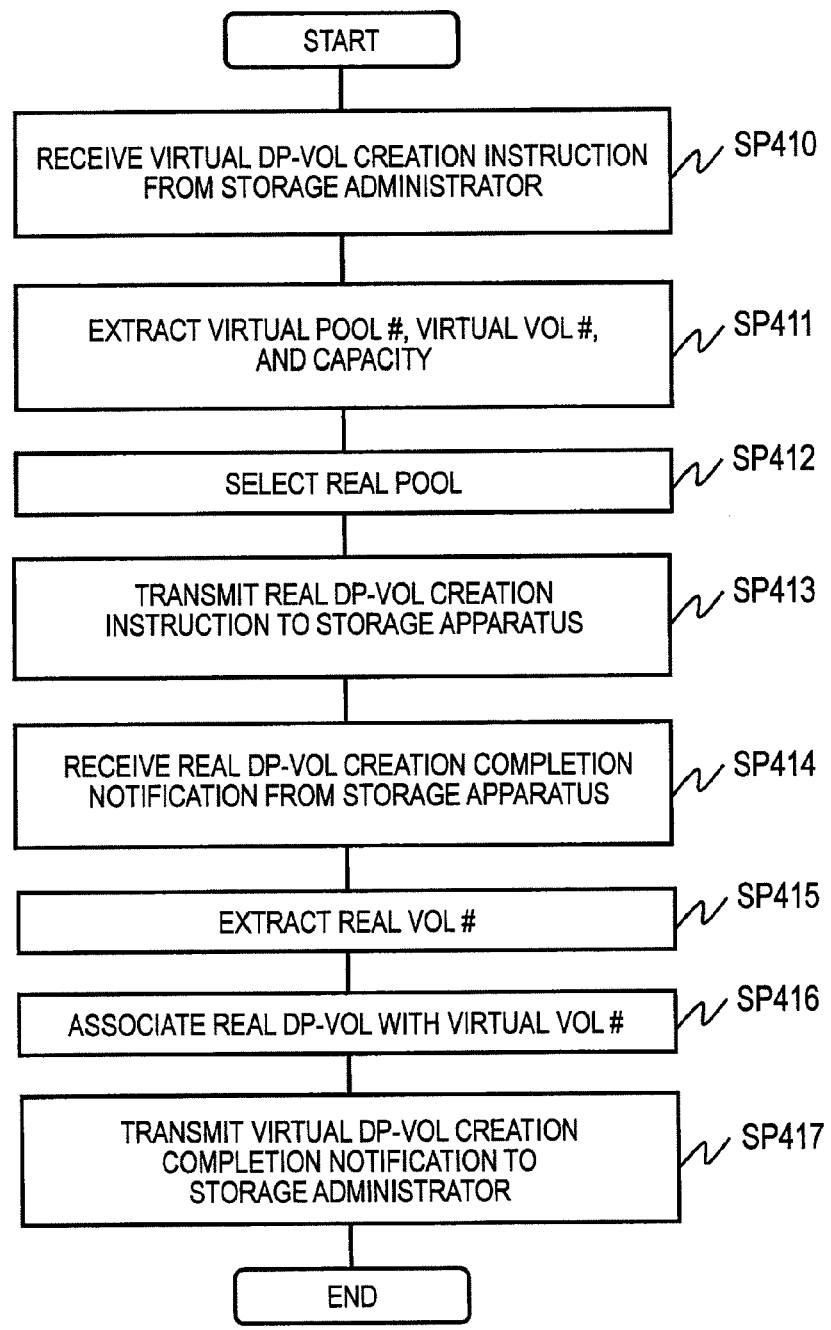
FIG. 12 is a flow chart illustrating steps of DP-VOL creating processing that is initiated and conducted by the management computer in the first embodiment.

FIG. 12 is a flow chart illustrating processing that is executed by the management computer 8 when a virtual DP-VOL creation instruction is received from a virtual storage administrator (hereinafter referred to as virtual DP-VOL creation processing B). The virtual DP-VOL creation processing B is implemented by the CPU 80 of the management computer 8 by executing a program. This may lessen the load on the storage apparatus 4.

The management computer 8 receives a virtual DP-VOL creation instruction from the virtual storage administrator (SP410), and first extracts a virtual POOL # and a virtual VOL # and capacity from the virtual DP-VOL creation instruction (SP411).

The management computer 8 next selects one DP-POOL 110 that is associated with the virtual POOL # extracted in Step SP411 (SP412). Specifically, the management computer 8 refers to the virtual POOL management table 240 of the memory 81 to identify an entry in which the same value as the virtual POOL # extracted in Step SP411 is set to the virtual POOL #241, and selects one sub-entry in the identified entry.

The management computer 8 next transmits a real DP-VOL creation instruction to the storage apparatus 4 where the DP-POOL 110 selected in Step SP412 is located (SP413). Specifically, the management computer 8 transmits the real POOL-VOL creation instruction to the storage apparatus 4 that is associated with the real storage apparatus #242 of the sub-entry selected in Step SP412. When transmitting the instruction, the management computer 8 includes in the real DP-VOL creation instruction the real POOL #243 of the sub-entry selected in Step SP412 and the capacity extracted in Step SP411.

The storage apparatus 4 that has received the real DP-VOL creation instruction creates a new DP-VOL 101 in the specified DP-POOL 110 following the real DP-VOL creation instruction, and transmits a real DP-VOL creation completion notification to the management computer 8. When transmitting the notification, the storage apparatus 4 includes the real VOL # of the newly created DP-VOL 101 in the real DP-VOL creation completion notification.

The management computer 8 receives the real DP-VOL creation completion notification from the storage apparatus 4 (SP414), and extracts the real VOL # from the real DP-VOL creation completion notification (SP415).

The management computer 8 next associates the DP-VOL 101 created by the storage apparatus 4 with the virtual VOL # extracted in Step SP411 (SP416). Specifically, the management computer 8 adds one entry to the virtual VOL management table 230 of the memory 81. In the added entry, the virtual VOL # extracted in Step SP411 is set to the virtual VOL #231, the real storage apparatus #242 of the sub-entry selected in Step SP412 is set to the real storage apparatus #232, and the real VOL # extracted in Step SP415 is set to the real VOL #233.

The management computer 8 also transmits to all storage apparatus 4 an instruction to update their respective virtual VOL management tables 230. Receiving the instruction, each storage apparatus 4 adds one entry to the virtual VOL management table 230 in the same way as the management computer 8.

Lastly, the management computer 8 transmits a virtual DP-VOL creation completion notification to the virtual storage administrator (SP417), and ends the virtual DP-VOL creating processing B.

As has been described, according to this embodiment, a plurality of real storage apparatuses which provide a virtual storage apparatus can be run without the need for being conscious of physical boundaries (real boundaries), and the storage running cost is accordingly reduced. When adding a virtual POOL-VOL to a virtual POOL or when creating a virtual DP-VOL from a virtual POOL, a real storage resource associated with the virtual POOL-VOL, or a real storage resource associated with the virtual DP-VOL, can be constructed within a single storage apparatus, and the processing efficiency in the virtual storage apparatus is thus prevented from dropping.

Second Embodiment

A computer system of a second embodiment of this invention is the same as the computer system of the first embodiment, except a part of the configuration and processing. The following description focuses on the difference from the first embodiment.

(2-1) Computer System Configuration in this Embodiment

Figure 13:
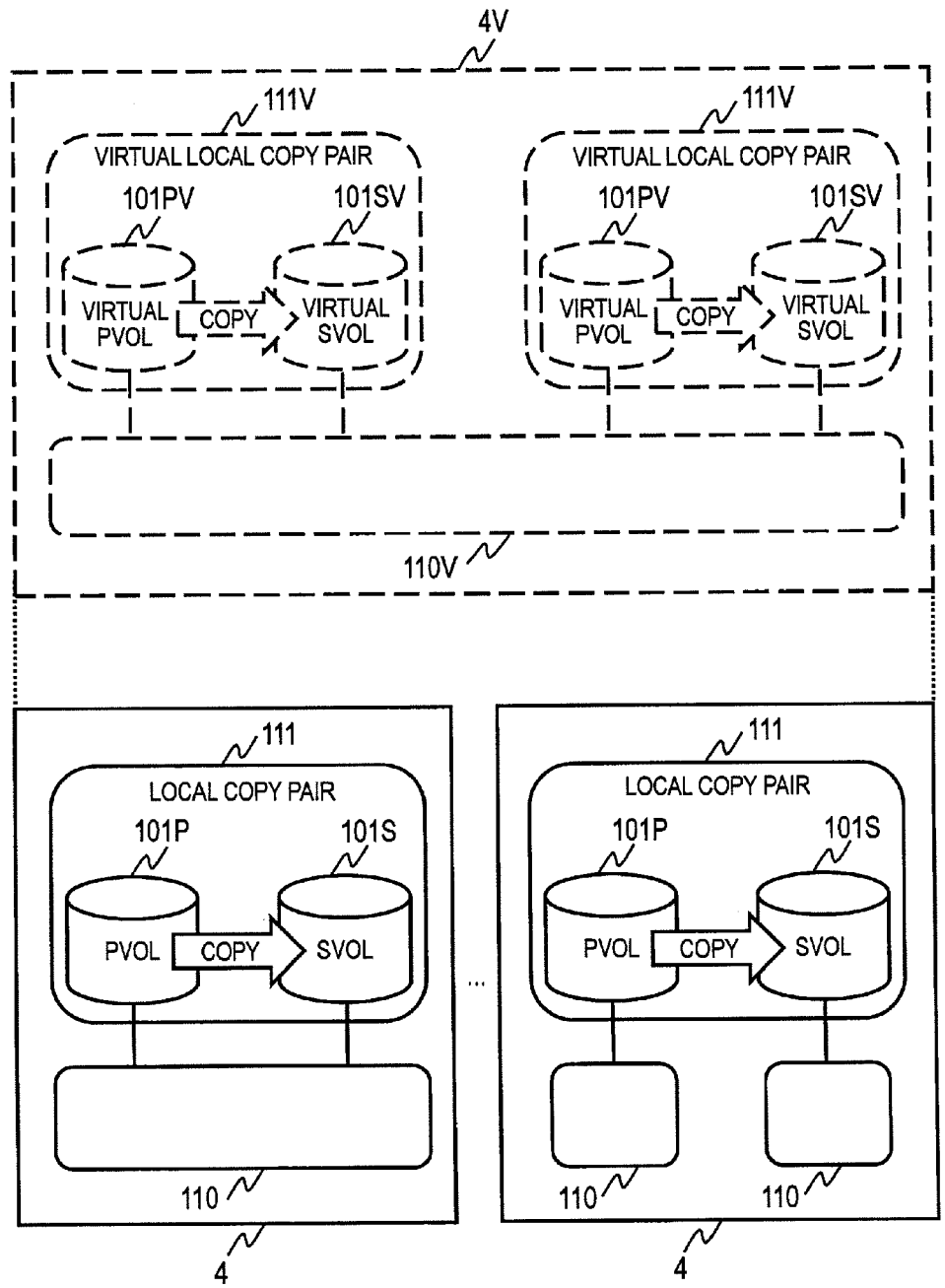
FIG. 13 is a diagram illustrating an association relation between the real configuration and virtual configuration of storage apparatus in a second embodiment of this invention.

FIG. 13 illustrates an association relation between the real configuration of the storage apparatus 4 and a virtual configuration provided to the virtual storage management computer 3 by the storage apparatus 4.

In the real configuration, each storage apparatus 4 manages at least one local copy pair made up of a PVOL 101P, which is the copy source DP-VOL 101, and an SVOL 101S, which is the copy destination DP-VOL 101.

When creating the local copy pair 111, the storage apparatus 4 copies every piece of data in the PVOL 101P to the SVOL 101S. The storage apparatus 4 then makes update write to the PVOL 101P reflected on the SVOL 101S as well as manages a differential between the PVOL 101P and the SVOL 101S, depending on the state of the local copy pair 111.

In the virtual configuration, a virtual local copy pair 111V, a virtual PVOL 101PV, and a virtual SVOL 101SV are set in the virtual storage apparatus 4V. Each virtual local copy pair 111V is associated with one of the local copy pairs 111 on a one-to-one basis. Each virtual PVOL 101PV is associated with one of the PVOLs 101P on a one-to-one basis. Each virtual SVOL 101SV is associated with one of the SVOLs 101S on a one-to-one basis.

Figure 14:
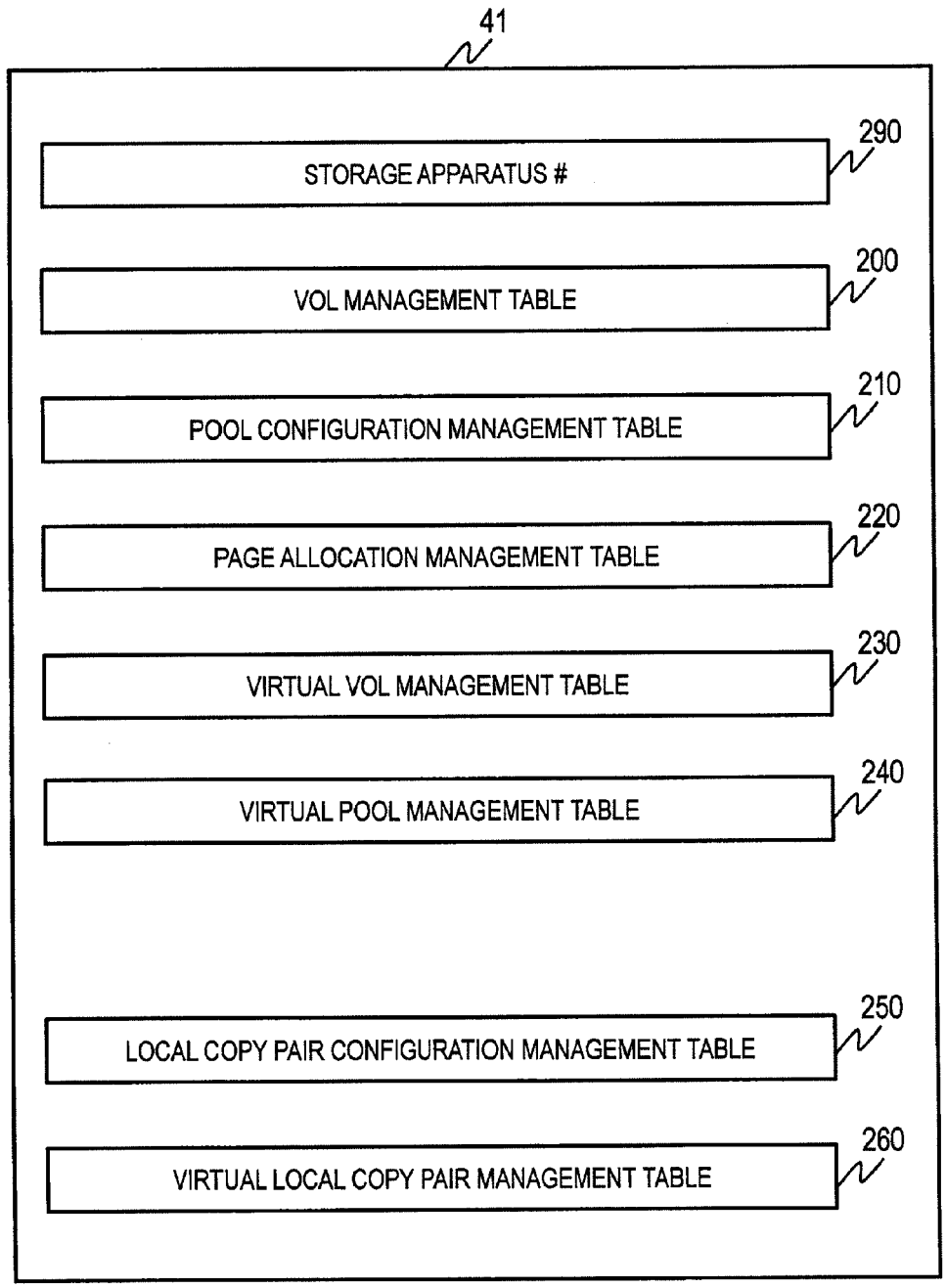
FIG. 14 is a diagram illustrating conceptually a data configuration in a memory of each storage apparatus in the second embodiment.

FIG. 14 illustrates main configuration information stored in the memory 41 of each storage apparatus 4. As illustrated in FIG. 14, the memory 41 stores a local copy pair configuration management table 250 and a virtual local copy pair management table 260. The local copy pair configuration management table 250 is a local table for storing information unique to each storage apparatus 4. The virtual local copy pair management table 260 is common to all storage apparatus 4 that provide real storage resources to the virtual storage apparatus 4V. The table 260 is updated in the same way as in the first embodiment.

FIG. 15 illustrates a configuration example of the local copy pair configuration management table 250. The CPU 40 of each storage apparatus 4 uses the local copy pair configuration management table 250 to manage information about the local copy pairs 111. Registered in the local copy pair configuration management table 250 for each local copy pair 111 are, for example, a real pair #251, a real PVOL #252, a real SVOL #253, and a pair state 254.

The real pair #251 is a number used to identify each local copy pair 111 uniquely throughout the storage apparatuses 4. The real PVOL #252 is a number used to identify, uniquely throughout the storage apparatuses 4, the PVOL 101P of the local copy pair 111 that is identified by the real pair #251.

The real SVOL #253 is a number used to identify, uniquely throughout the storage apparatuses 4, the SVOL 101S of the local copy pair 111 that is identified by the real pair #251.

The pair state 254 is information indicating the state of the local copy pair 111 that is identified by the real pair #251, and has a value "PAIR" or "PSUS". When the pair state 254 is "PAIR", the storage apparatus 4 makes update write to the PVOL 101P that is identified by the real PVOL #252 reflected on the SVOL 101S that is identified by the real SVOL #253 as well.

Update copy for making update write reflected may be executed in synchronization with the update write, or may be executed out of synchronization with the update write. When the pair state 254 is "PSUS", on the other hand, the storage apparatus 4 does not execute update copy and executes processing of managing a differential between the PVOL 101P that is identified by the real PVOL #252 and the SVOL 101S that is identified by the real SVOL #253.

FIG. 16 illustrates a configuration example of the virtual local copy pair management table 260. The CPU 40 of each storage apparatus 4 uses the virtual local copy pair management table 260 to manage information about the association between one virtual local copy pair 111V and one local copy pair 111. Registered in the virtual local copy pair management table 260 are, for example, a virtual pair #261, a real storage apparatus #262, and a real pair #263.

The virtual pair #261 is a number used to identify each virtual local copy pair 111V uniquely throughout the virtual storage apparatus 4V. The real storage apparatus #262 is a number used to uniquely identify the storage apparatus 4 where the local copy pair 111 that is associated with the virtual local copy pair 111V identified by the virtual pair #261 is located.

The real pair #263 is a number used to identify, uniquely throughout the storage apparatuses 4 identified by the real storage apparatus #262, the local copy pair 111 that is associated with the virtual local copy pair 111v identified by the virtual pair #261. The real pair #263 corresponds to the real pair #251 of the local copy pair configuration management table 250.

(2-2) Local Copy Pair Constructing Processing in this Embodiment

Virtual local copy pair constructing processing executed in the computer system 1 of this embodiment is described below. In the following description, letters "SP" prefixed to a reference numeral mean "processing step".

Figure 17:
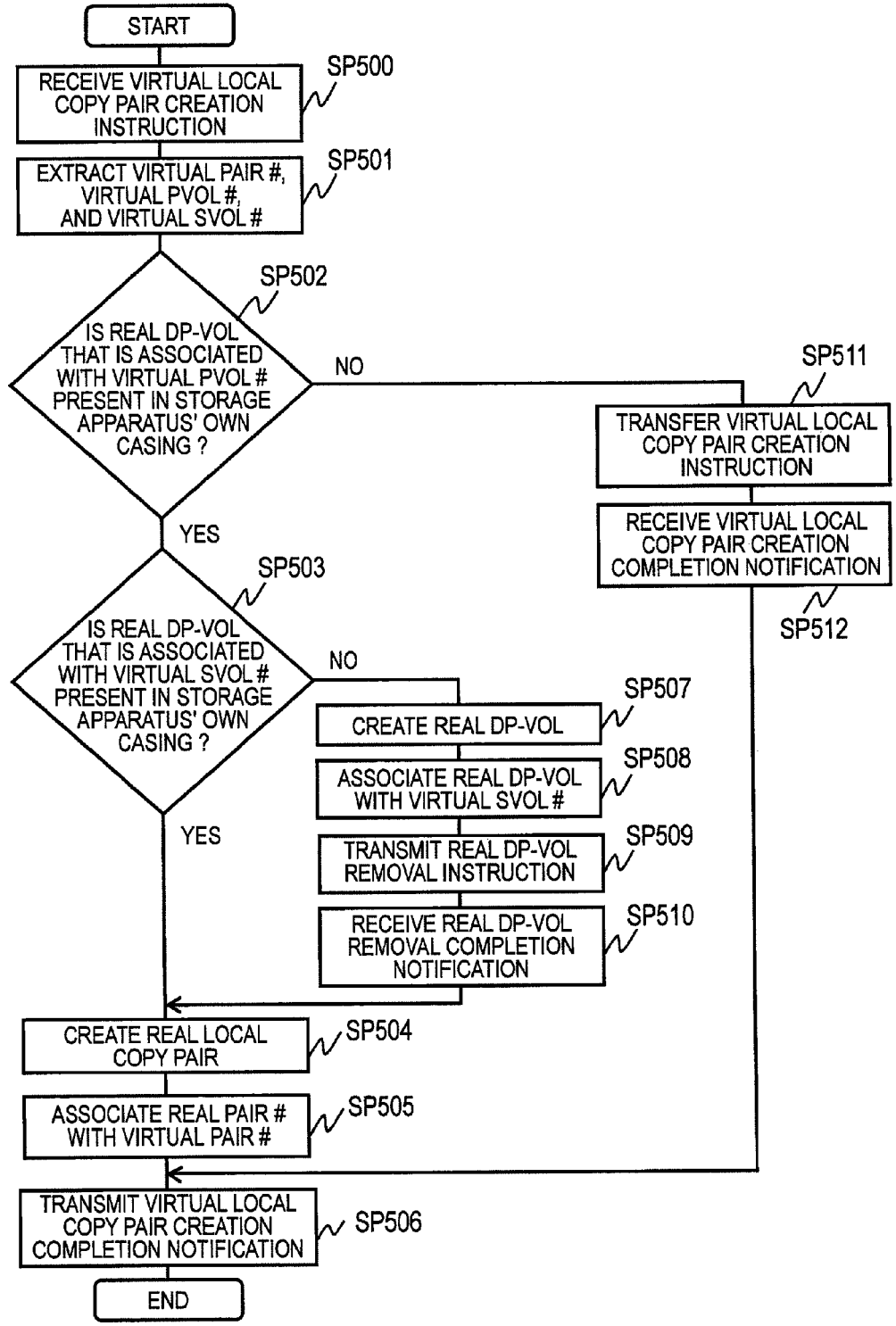
FIG. 17 is a flow chart illustrating steps of local copy pair creating processing of the storage apparatus in the second embodiment.

FIG. 17 is a flow chart illustrating processing that is executed by one of the storage apparatus 4 that receives a virtual local copy pair creation instruction from the virtual storage management computer 3 (hereinafter referred to as virtual local copy pair creating processing A). The virtual local copy pair creating processing A is implemented by the CPU 40 of the storage apparatus 4 by executing a program.

The storage apparatus 4 receives a virtual local copy pair creation instruction from the virtual storage management computer 3 (SP500), and first extracts a virtual pair #, a virtual PVOL #, and a virtual SVOL # from the virtual local copy pair creation instruction (SP501).

The storage apparatus 4 next determines whether or not the DP-VOL 101 that is associated with the virtual PVOL # extracted in Step SP501 is present in its own casing (SP502). Specifically, the storage apparatus 4 refers to the virtual VOL management table 230 to identify an entry in which the same value as the virtual PVOL # extracted in Step SP501 is set to the virtual VOL #231, and determines whether or not the real storage apparatus #232 of the identified entry matches the storage apparatus #290.

When the result of this determination is positive (SP502: YES), the storage apparatus 4 proceeds to Step SP503 to determine whether or not the DP-VOL 101 that is associated with the virtual SVOL # extracted in Step SP501 is present in its own casing. Specifically, the storage apparatus 4 refers to the virtual VOL management table 230 to identify an entry in which the virtual VOL #231 matches the virtual SVOL # extracted in Step SP501, and determines whether or not the real storage apparatus #232 of the identified entry matches the storage apparatus #290.

When the result of this determination is positive (SP503: YES), the storage apparatus 4 proceeds to Step SP504 to create one local copy pair 111 between two DP-VOLs 101 associated respectively with the virtual PVOL # and the virtual SVOL # that have been extracted in Step SP501.

Specifically, the storage apparatus 4 adds one entry to the local copy pair configuration management table 250. In the added entry, a number that is not used in any other entry is set to the real pair #251, the real VOL #233 of the entry identified in Step SP502 is set to the real PVOL #252, a real VOL # of the entry identified in Step SP503 is set to the real SVOL #253, and "PAIR" is set to the pair state 254.

The storage apparatus 4 next associates the local copy pair 111 created in Step SP504 with the virtual pair # extracted in Step SP501 (SP505). Specifically, the storage apparatus 4 adds one entry to the virtual local copy pair management table 260. In the added entry, the virtual pair # extracted in Step SP501 is set to the virtual pair #261, the storage apparatus #290 is set to the real storage apparatus #262, and a number set to the real pair #251 in Step SP504 is set to the real pair #263.

The storage apparatus 4 also transmits to all other storage apparatus 4 an instruction to update their respective virtual pair local copy management table 260. Receiving the instruction, each storage apparatus 4 adds one entry to the virtual pair local copy management table 260 in the same way as the storage apparatus 4 that has transmitted the instruction.

Lastly, the storage apparatus 4 transmits a virtual local copy pair creation completion notification to the virtual storage management computer 3 (SP506), and ends the virtual local copy pair creating processing A.

In the case where the result of the determination of Step SP502 is negative (SP502: NO), on the other hand, the storage apparatus 4 proceeds to Step SP511 to transfer the virtual local copy pair creation instruction to the storage apparatus 4 where the DP-VOL 101 that is associated with the virtual PVOL # extracted in Step SP501 is located. Specifically, the storage apparatus 4 transfers the virtual local copy pair creation instruction to the storage apparatus 4 that is associated with the real storage apparatus #232 of the entry identified in Step SP502.

The storage apparatus 4 to which the virtual local copy pair creation instruction has been transferred executes Steps SP500 to SP506. In Step SP500, however, the storage apparatus 4 to which the virtual local copy pair creation instruction has been transferred receives a virtual local copy pair creation instruction from the storage apparatus 4 that has transferred the virtual local copy pair creation instruction, instead of from the virtual storage management computer 3. In addition, the storage apparatus 4 to which the virtual local copy pair creation instruction has been transferred always obtains a positive result in the determination of Step SP502. Further, in Step SP506, the storage apparatus 4 to which the virtual local copy pair creation instruction has been transferred transmits a virtual local copy pair creation completion notification to the storage apparatus 4 that has transferred the virtual local copy pair creation instruction, instead of to the virtual storage management computer 3.

The storage apparatus 4 that has transferred the virtual local copy pair creation instruction receives the virtual local copy pair creation completion notification from the storage apparatus 4 to which the virtual local copy pair creation instruction has been transferred (SP512), and proceeds to Step SP506.

In the case where the result of the determination of Step SP503 is negative (SP503: NO), the storage apparatus 4 proceeds to Step SP507 to create a new DP-VOL 101 in one of the DP-POOLs 110 within its own casing. Specifically, the storage apparatus 4 adds one entry to the VOL management table 200. In the added entry, a number that is not used in any other entry is set to the real VOL #201, and "DP" is set to the type 202.

The storage apparatus 4 also selects one entry from the POOL configuration management table 210 to set the real POOL #211 of the selected entry to the real POOL #205. The capacity of the DP-VOL 101 that is associated with the virtual SVOL # extracted in Step SP501 is set to the capacity 207. The RAID group #203, the start LBA 204, and the end LBA 205 are left undefined.

The storage apparatus 4 next associates the DP-VOL 101 created in Step SP507 with the virtual SVOL # extracted in Step SP501 (SP508). Specifically, the storage apparatus 4 adds one entry to the virtual VOL management table 230. In the added entry, the virtual SVOL # extracted in Step SP501 is set to the virtual VOL #231, the storage apparatus #290 is set to the real storage apparatus #232, and the number set to the real VOL #201 in Step SP507 is set to the real VOL #233.

The storage apparatus 4 next transmits a DP-VOL removal instruction to the storage apparatus 4 where the DP-VOL 101 that is associated with the virtual SVOL # extracted in Step SP501 is located (SP509). Specifically, the storage apparatus 4 transmits a DP-VOL removal instruction to the storage apparatus 4 that is associated with the real storage apparatus #232 of the entry identified in Step SP503. When transmitting the instruction, the storage apparatus 4 includes in the DP-VOL removal instruction a real VOL # of the entry identified in Step SP503. The removal of the DP-VOL may be omitted.

The storage apparatus 4 that has received the DP-VOL removal instruction removes the DP-VOL 101 that is associated with the real VOL # included in the DP-VOL removal instruction. Specifically, the storage apparatus 4 that has received the DP-VOL removal instruction updates the VOL management table 200 by deleting an entry in which the real VOL #201 matches the real VOL # included in the DP-VOL removal instruction. The storage apparatus 4 that has received the DP-VOL removal instruction then transmits a DP-VOL removal completion notification to the storage apparatus 4 that has transmitted the DP-VOL removal instruction.

The storage apparatus 4 that has transmitted the DP-VOL removal instruction receives the DP-VOL removal completion notification from the storage apparatus 4 that has received the DP-VOL removal instruction (SP510), and proceeds to Step SP504.

(2-3) the Configuration and Processing for the Case where the Management Computer Takes Initiative The virtual local copy pair creating processing in which the relevant storage apparatus 4 takes a central role in the description given above may be initiated and conducted by the storage management computer 8. This may lessen the load on the storage apparatus 4.

In the case where the storage management computer 8 initiates and conducts the processing, the storage management computer 8 holds the virtual VOL management table 230 and the virtual local copy pair management table 260 in the memory 81, and keeps the tables consistent with the virtual VOL management table 230 and the virtual local copy pair management table 260 that each storage apparatus 4 holds in the memory 41.

Figure 18:
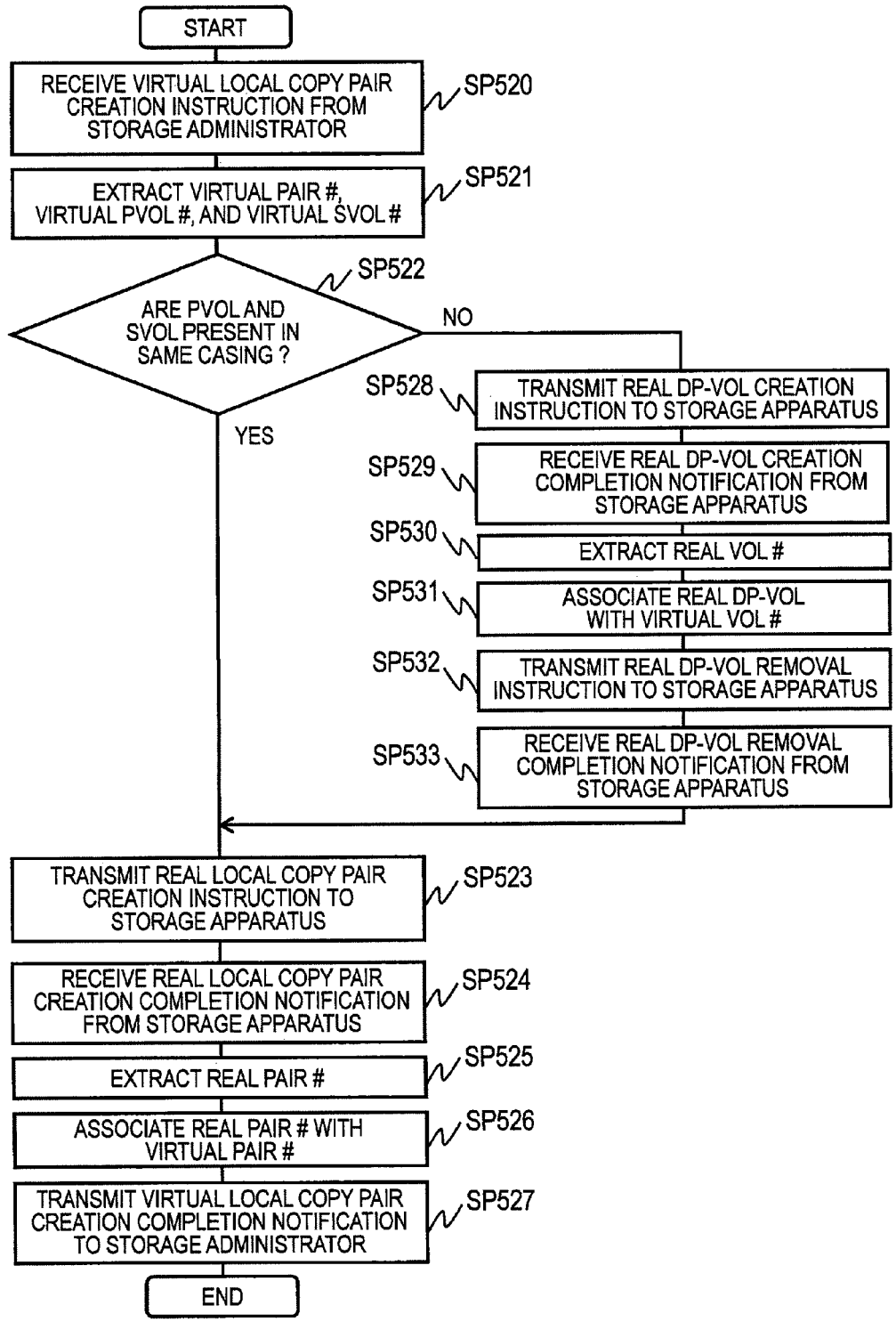
FIG. 18 is a flow chart illustrating steps of local copy pair creating processing that is initiated and conducted by a management computer in the second embodiment.

FIG. 18 is a flow chart illustrating processing that is executed by the storage management computer 8 when a virtual local copy pair creation instruction is received from the virtual storage administrator (hereinafter referred to as virtual local copy pair creating processing B). The virtual local copy pair creating processing B is implemented by the CPU 80 of the storage management computer 8 by executing a program.

The storage management computer 8 receives a virtual local copy pair creation instruction from the virtual storage administrator (SP520), and first extracts a virtual pair #, a virtual PVOL #, and a virtual SVOL # from the virtual local copy pair creation instruction (SP521).

The storage management computer 8 next determines whether or not the PVOL 101P that is associated with the virtual PVOL # extracted in Step SP521 and the SVOL 101S that is associated with the virtual SVOL # extracted in Step SP521 are present in the same casing (the same storage apparatus 4) (SP522).

Specifically, the storage management computer 8 refers to the virtual VOL management table 230 of the memory 81 to identify an entry in which the same value as the virtual PVOL # extracted in Step SP521 is set to the virtual VOL #231, and an entry in which the same value as the virtual SVOL # extracted in Step SP521 is set to the virtual VOL #231, and determines whether or not the identified entries have a matching value as the real storage apparatus #232.

When the result of this determination is positive (SP522: YES), the storage management computer 8 proceeds to Step SP523 to transmit a real local copy pair creation instruction to the storage apparatus 4 where the PVOL 101P that is associated with the virtual PVOL # extracted in Step SP521 is located. When transmitting the instruction, the storage management computer 8 includes in the real local copy pair creation instruction the real VOL #233 of the entry that is associated with the virtual PVOL # identified in Step SP521 and the real VOL #233 of the entry that is associated with the virtual SVOL # identified in Step SP521.

The storage apparatus 4 that has received the real local copy pair creation instruction creates one local copy pair 111 following the real local copy pair creation instruction, and transmits a real local copy pair creation completion notification to storage management computer 8. In transmitting the notification, the storage apparatus 4 includes the real pair # of the newly created local copy pair 111 in the real local copy pair creation completion notification.

The storage management computer 8 receives the real local copy pair creation completion notification from the storage apparatus 4 (SP524), and extracts the real pair # from the real local copy pair creation completion notification (SP525).

The storage management computer 8 next associates the local copy pair 111 created by the storage apparatus 4 with the virtual pair # extracted in Step SP521 (SP526). Specifically, the storage management computer 8 adds one entry to the virtual local copy pair management table 260 in the memory 81. In the added entry, the virtual pair # extracted in Step SP521 is set to the virtual pair #261, the real storage apparatus #232 of the entry identified in Step SP522 is set to the real storage apparatus #262, and the real pair # extracted in Step SP525 is set to the real pair #263.

The storage management computer 8 also transmits to all storage apparatus 4 an instruction to update their respective virtual local copy pair management tables 260. Receiving the instruction, each storage apparatus 4 adds one entry to the virtual local copy pair management table 260 in the same way as the storage management computer 8.

Lastly, the storage management computer 8 transmits a virtual local copy pair creation completion notification to the virtual storage administrator (SP526), and ends the virtual local copy pair creating processing B.

In the case where the result of the determination of Step SP522 is negative (SP522: NO), on the other hand, the storage management computer 8 proceeds to Step SP528 to transmit a real DP-VOL creation instruction to the storage apparatus 4 where the PVOL 101P that is associated with the virtual PVOL # extracted in Step SP521 is located.

The storage apparatus 4 that has received the real DP-VOL creation instruction creates one DP-VOL 101 following the real DP-VOL creation instruction, and transmits a real DP-VOL creation completion notification to the storage management computer 8. When transmitting the notification, the storage apparatus 4 includes the real VOL # of the newly created DP-VOL in the real DP-VOL creation completion notification.

The storage management computer 8 receives the real DP-VOL creation completion notification from the storage apparatus 4 (SP529), and extracts the real VOL # from the real DP-VOL creation completion notification (SP530).

The storage management computer 8 next associates the DP-VOL 101 created by the storage apparatus 4 with the virtual SVOL # extracted in Step SP521 (SP531). Specifically, the storage management computer 8 adds one entry to the virtual VOL management table 230 of the memory 81.

In the added entry, the virtual SVOL # extracted in Step SP521 is set to the virtual VOL #231, the real storage apparatus #232 of the entry that has been identified in Step SP522 as an entry where the same value as the virtual PVOL # extracted in Step SP521 is set to the virtual VOL #231 is set to the real storage apparatus #232, and the real VOL # extracted in Step SP530 is set to the real VOL #233.

The storage management computer 8 next transmits a real DP-VOL removal instruction to the storage apparatus 4 where the SVOL 101S that is associated with the virtual SVOL # extracted in Step SP521 is located (SP532). When transmitting the instruction, the storage management computer 8 includes in the real DP-VOL removal instruction the real VOL # of the SVOL 101S that is associated with the virtual SVOL # extracted in Step SP521.

The storage apparatus 4 that has received the real DP-VOL removal instruction removes the specified DP-VOL 101 following the real DP-VOL removal instruction, and transmits a real DP-VOL removal completion notification to the storage management computer 8. The storage management computer 8 receives the real DP-VOL removal completion notification from the storage apparatus 4 (SP533), and proceeds to Step SP523.

As has been described, according to this embodiment, a plurality of real storage apparatuses which provides a virtual storage apparatus can be run without the need for being conscious of physical boundaries (real boundaries), and the storage running cost is accordingly reduced. When creating a virtual local copy pair, two real VOLs that are respectively associated with a virtual PVOL and a virtual SVOL can be constructed within a single storage apparatus, and the lowering of processing efficiency due to inter-storage communication can thus be prevented.

The processing described above that accompanies the creation of a virtual local copy pair is applicable to a storage system that does not use pools.

Third Embodiment

A computer system of a third embodiment is the same as the computer system of the first embodiment of this invention, except a part of the configuration and processing. The following description focuses on the difference from the first embodiment.

(3-1) Computer System Configuration in this Embodiment

Figure 19:
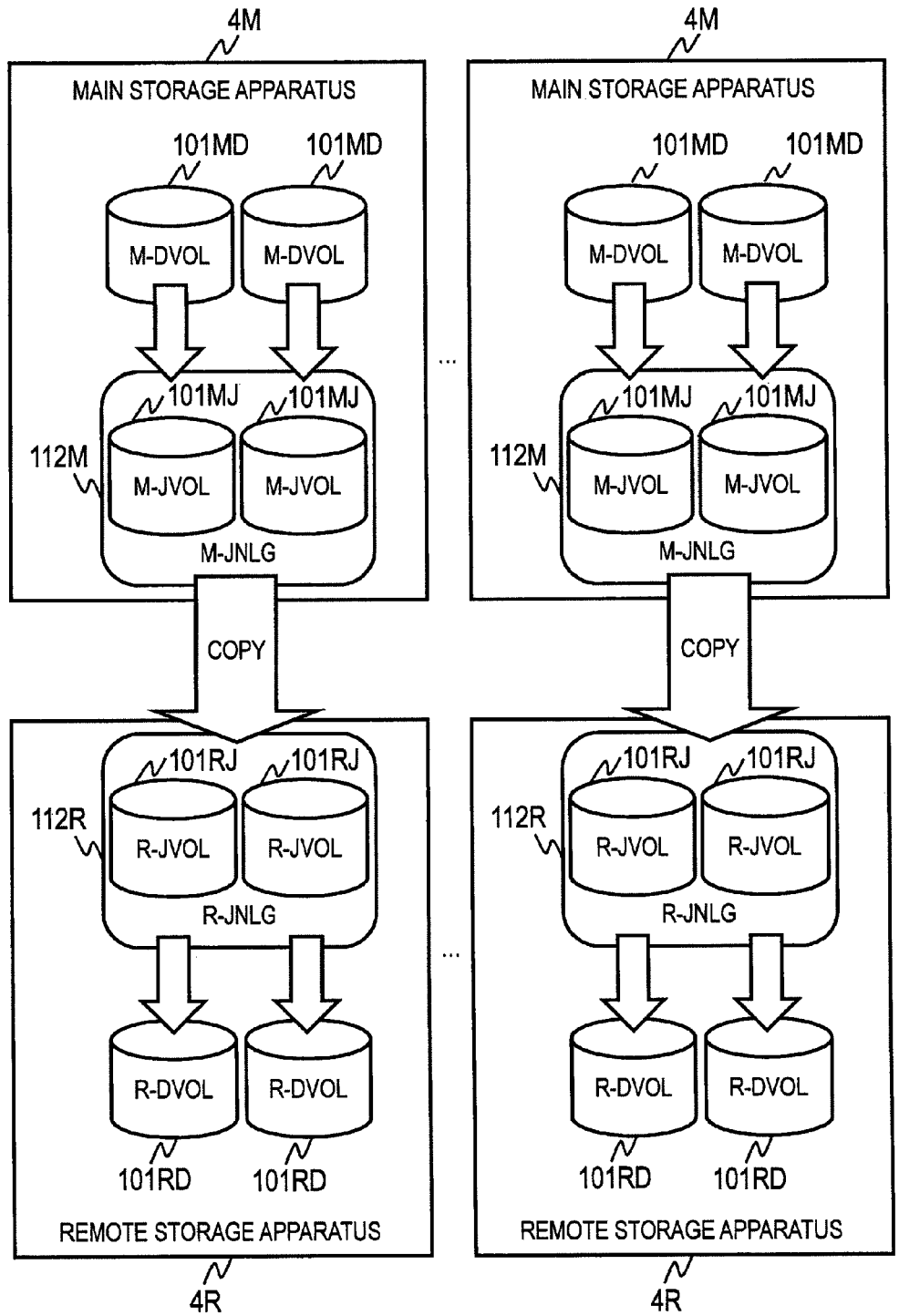
FIG. 19 is a diagram illustrating the real configuration of storage apparatuses in a third embodiment of this invention.

FIG. 19 illustrates the real configuration of a computer system 1 in this embodiment. The computer system 1 in this embodiment includes at least one main storage apparatus 4M, which is a copy source storage apparatus 4, and at least one remote storage apparatus 4R, which is a copy destination storage apparatus 4. The main storage apparatus 4M and the remote storage apparatus 4R are associated with each other on a one-to-one basis.

Each main storage apparatus 4M includes at least one M-DVOL 101MD, at least one M-JVOL 101MJ, and at least one M-JNLG 112M. The M-DVOL 101MD is the copy source DP-VOL 101, and the M-JVOL 101MJ is the DP-VOL 101 for temporarily saving a journal of update write to the M-DVOL 101MD.

The main storage apparatus 4M manages at least one M-JVOL 101MJ as the M-JNLG 112M, and manages at least one M-DVOL 101MD in association with one M-JNLG 112M.

Each remote storage apparatus 4R includes at least one R-DVOL 101RD, at least one R-JVOL 101RJ, and at least one R-JNLG 112R. The R-DVOL 101RD is the copy destination DP-VOL 101, and the R-JVOL 101RJ is the DP-VOL 101 for temporarily saving a journal of update copy from the main storage apparatus 4M.

The remote storage apparatus 4R manages at least one R-JVOL 101RJ as the R-JNLG 112R, and manages at least one R-DVOL 101RD in association with one R-JNLG 112R.

The main storage apparatus 4M receives update write to the M-DVOL 101MD from the host computer 2. The main storage apparatus 4M then writes update data in the M-DVOL 101MD, saves a journal of the update write in the M-JNLG 112M that is associated with the M-DVOL 101MD, and transmits a response to the update write to the host computer 2. The main storage apparatus 4M copies the journal saved in the M-JNLG 112 to the remote storage apparatus 4R out of synchronization with the update write.

Receiving the journal from the main storage apparatus 4M, the remote storage apparatus 4R saves the journal in the R-JNLG 112R. The remote storage apparatus 4R makes the journal that is saved in the R-JNLG 112R reflected on the R-DVOL 101RD out of synchronization with the reception of the journal.

Figure 20:
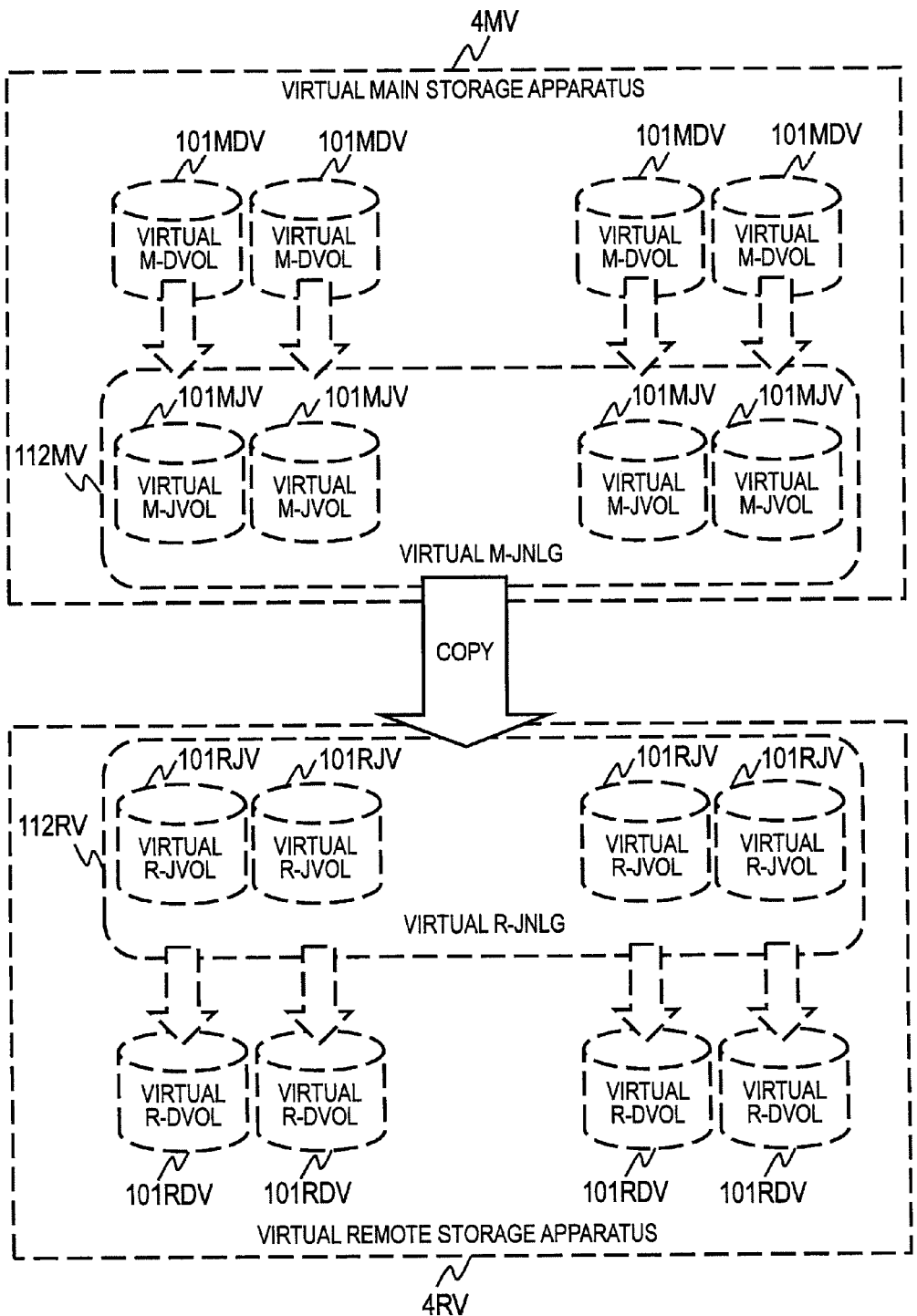
FIG. 20 is a diagram illustrating the virtual configuration of the storage apparatuses in the third embodiment.

FIG. 20 illustrates the virtual configuration of the computer system 1 in this embodiment. The computer system 1 in this embodiment includes a virtual main storage apparatus 4MV, which is a copy source virtual storage apparatus, and a virtual remote storage apparatus 4RV, which is a copy destination virtual storage apparatus.

The virtual main storage apparatus 4MV includes at least one virtual M-DVOL 101 MDV, at least one virtual M-JVOL 101MJV, and at least one virtual M-JNLG 112MV.

Each virtual M-DVO 101MDV is associated with one of the M-DVOLs 101MD on a one-to-one basis. Each virtual M-JVOL 101MJV is associated with one of the M-JVOLs 101MJ on a one-to-one basis. Each virtual M-JNLG 112MV is associated with one of the M-JNLGs 112M on a one-to-one basis.

The virtual remote storage apparatus 4RV includes at least one virtual R-DVOL 101RDV, at least one virtual R-JVOL 101RJV, and at least one virtual R-JNLG 112RV.

Each virtual R-DVOL 101RDV is associated with one of the R-DVOLs 101RD on a one-to-one basis. Each virtual R-JVOL 101RJV is associated with one of the R-JVOLs 101RJ on a one-to-one basis. Each virtual R-JNLG 112RV is associated with one of the R-JNLGs 112R on a one-to-one basis.

Figure 21:
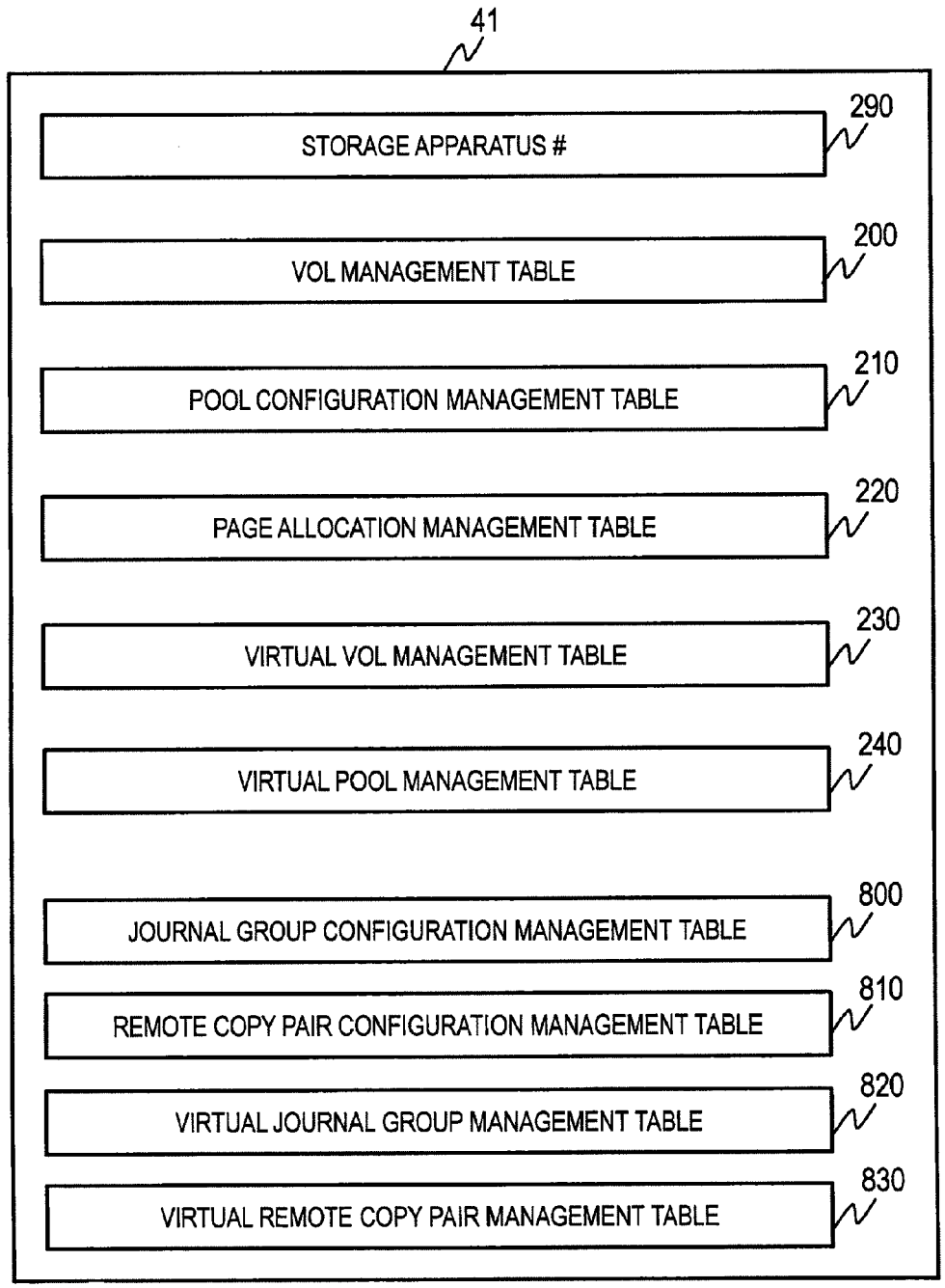
FIG. 21 is a diagram illustrating conceptually a data configuration in a memory of each storage apparatus in the third embodiment.

FIG. 21 illustrates main configuration information stored in the memory 41 of each main storage apparatus 4M and each remote storage apparatus 4R. As illustrated in FIG. 21, the memory 41 stores a journal group configuration management table 800, a remote copy pair configuration management table 810, a virtual journal group management table 820, and a virtual remote copy pair management table 830.

The journal group configuration management table 800 and the remote copy pair configuration management table 810 are local tables for storing information unique to each storage apparatus 4. The virtual journal group management table 820 and the virtual remote copy pair management table 830 are tables common to all storage apparatus 4 that provide real storage resources to the virtual storage apparatus 4V. The tables are updated in the manner described in the first embodiment.

Figure 22:
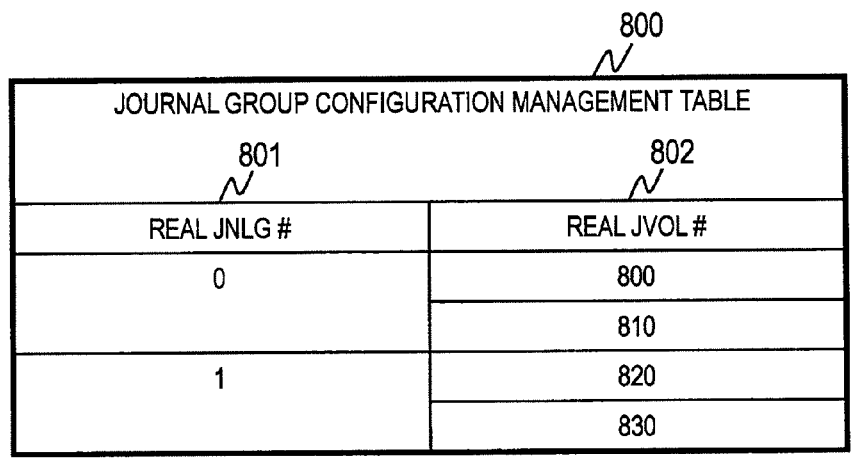
FIG. 22 is a diagram illustrating conceptually the data configuration of a journal group configuration management table of each storage apparatus in the third embodiment.

FIG. 22 illustrates a configuration example of the journal group configuration management table 800. The CPU 40 of each main storage apparatus 4M uses the journal group configuration management table 800 to manage information about each M-JNLG 112M, and the CPU 40 of each remote storage apparatus 4R uses the journal group configuration management table 800 to manage information about each R-JNLG 112R. Registered in the journal group configuration management table 800 for each M-JNLG 112M or for each R-JNLG 112R are, for example, a real JNLG #801 and at least one real VOL #802.

The real JNLG #801 is a number used to identify each M-JNLG 112M uniquely throughout the main storage apparatus 4M, or a number used to identify each R-JNLG 112R uniquely throughout the remote storage apparatus 4R.

The real VOL #802 is a number used to identify, uniquely throughout the main storage apparatus 4M or throughout the remote storage apparatus 4R, each M-JVOL 112M that constitutes the M-JNLG 112M identified by the real JNLG #801, or each R-JVOL 112R that constitutes the R-JNLG 112R identified by the real JNLG #801. At least one real VOL #802 is associated with one real JNLG #801.

Figure 23:
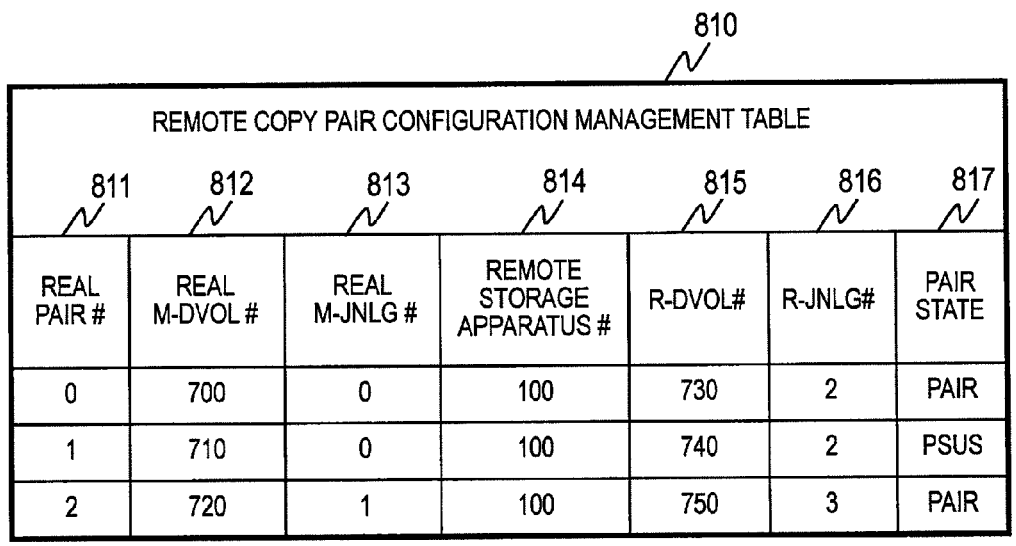
FIG. 23 is a diagram illustrating conceptually the data configuration of a remote copy pair configuration management table of each storage apparatus in the third embodiment.

FIG. 23 illustrates a configuration example of the remote copy pair configuration management table 810. The CPU 40 of each main storage apparatus 4M uses the remote copy pair configuration management table to manage information about a remote copy pair. Registered in the remote copy pair configuration management table 810 for each remote copy pair are, for example, a real pair #811, a real M-DVOL #812, a real M-JNLG #813, a remote storage apparatus #814, an R-DVOL #815, an R-JNLG #816, and a pair state 817.

The real pair #811 is a number used to identify each remote copy pair uniquely throughout the main storage apparatus 4M. The real M-DVOL #812 is a number used to identify, uniquely throughout the main storage apparatus 4M, the M-DVOL 101MD of a remote copy pair identified by the real pair #811.

The real M-JNLG #813 is a number used to identify, uniquely throughout the main storage apparatus 4M, the M-JNLG 112M that temporarily saves a journal of update write to the M-DVOL 101MD of a remote copy pair identified by the real pair #811.

The remote storage apparatus #814 is a number used to uniquely identify the remote storage apparatus 4R that is the copy destination of a remote copy pair identified by the real pair #811.

The R-DVOL #815 is a number used to identify, uniquely throughout the main storage apparatus 4M, the R-DVOL 101RD that is the copy destination of a remote copy pair identified by the real pair #811.

The R-JNLG #816 is a number used to identify, uniquely throughout the copy destination remote storage apparatus 4R, the R-JNLG 112R that is the copy destination of a remote copy pair identified by the real pair #811.

The pair state 817 is information indicating the state of a remote copy pair identified by the real pair #811, and has a value "PAIR" or "PSUS". When the pair state 817 is "PAIR", the main storage apparatus 4M copies update write performed on the M-DVOL 101MD that is identified by the real M-DVOL #812 to the remote storage apparatus 4R that is identified by the remote storage apparatus #814.

When the pair state 817 is "PSUS", on the other hand, the main storage apparatus 4M does not execute copy and manages a differential between the M-DVOL 101MD identified by the ream M-DVOL #812 and the R-DVOL 101RD identified by the remote storage apparatus #814 and by the R-DVOL #815.

FIG. 24 illustrates the data configuration of the virtual journal group management table 820. The CPU 40 of each main storage apparatus 4M uses the virtual journal group management table to manage information about the association between one virtual M-JNLG 112MV and one M-JNLG 112M. The CPU 40 of each remote storage apparatus 4R uses the virtual journal group management table to manage information about the association between one virtual R-JNLG 112RV and one R-JNLG 112R.

Registered in the virtual journal group management table 820 for each virtual M-JNLG 112MV or for each virtual R-JNLG 112RV are, for example, a virtual JNLG #821, a real storage apparatus #822, and a real JNLG #823.

The virtual JNLG #821 is a number used to identify each virtual M-JNLG 112MV or each virtual R-JNLG 112RV uniquely throughout the virtual main storage apparatus 4MV or throughout the virtual remote storage apparatus 4RV.

The real storage apparatus #822 is a number used to uniquely identify the main storage apparatus 4M where the M-JNLG 112M that is associated with the virtual M-JNLG 112MV identified by the virtual JNLG #821 is located, or the remote storage apparatus 4R where the R-JNLG 112R that is associated with the virtual R-JNLG 112RV identified by the virtual JNLG #821 is located.

The real JNLG #823 is a number used to identify, uniquely throughout the main storage apparatus 4M or the remote storage apparatus 4R that is identified by the real storage apparatus #822, the M-JNLG 112M that is associated with the virtual M-JNLG 112MV identified by the virtual JNLG #821 or the R-JNLG 112R that is associated with the virtual R-JNLG 112RV identified by the virtual JNLG #821. The real JNLG #823 corresponds to the real JNLG #801 of the journal group configuration management table 800.

FIG. 25 illustrates a configuration example of the virtual remote copy pair management table 830. The CPU 40 of each main storage apparatus 4M uses the virtual remote copy pair management table 830 to manage information about the association between a virtual remote copy pair and a remote copy pair. Registered in the virtual remote copy pair management table 830 for each virtual remote copy pair are, for example, a virtual pair #831, a real storage apparatus #832, and a real pair #833.

The virtual pair #831 is a number used to identify each virtual remote copy pair uniquely throughout the virtual main storage apparatus 4MV. The real storage apparatus #832 is a number used to uniquely identify the main storage apparatus 4M where a remote copy pair that is associated with a virtual remote copy pair identified by the virtual pair #831 is located.

The real pair #833 is a number used to identify, uniquely throughout the main storage apparatus 4M identified by the real storage apparatus #832, a remote copy pair that is associated with a virtual remote copy pair identified by the virtual pair #831. The real pair #833 corresponds to the real pair #811 of the remote copy pair configuration management table 810.

(3-2) Journal Group Constructing Processing in this Embodiment

Journal group constructing processing executed in the computer system 1 is described below. In the following description, letters "SP" prefixed to a reference numeral mean "processing step".

Figure 26:
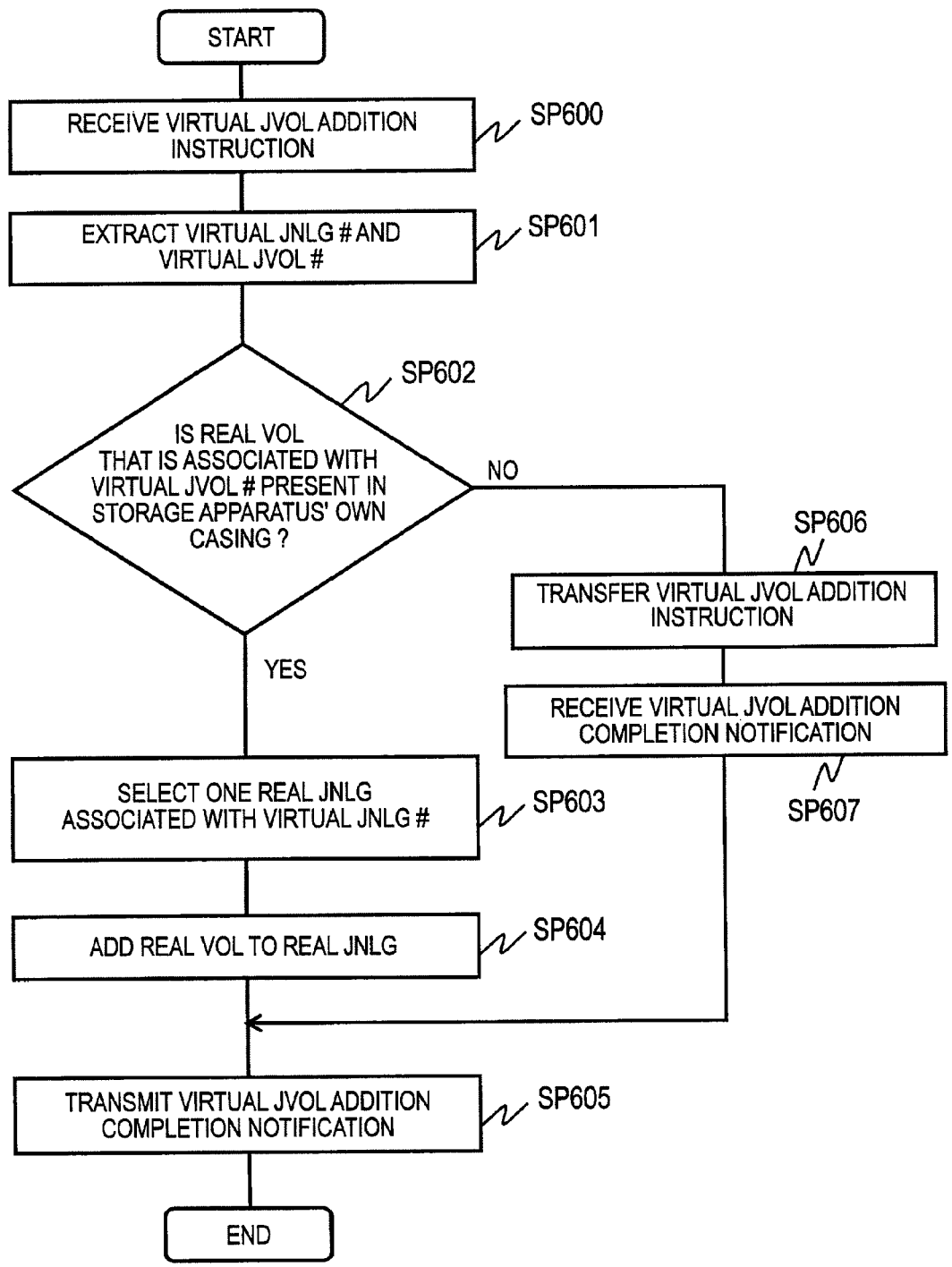
FIG. 26 is a flow chart illustrating steps of JVOL adding processing of the storage apparatus in the third embodiment.

FIG. 26 is a flow chart illustrating processing that is executed by one of the main storage apparatus 4M or one of the remote storage apparatus 4R that receives a virtual JVOL addition instruction from the virtual storage management computer 3 (hereinafter referred to as virtual JVOL adding processing A). The virtual JVOL adding processing A is implemented by the CPU 40 of the main storage apparatus 4M or of the remote storage apparatus 4R by executing a program.

The main storage apparatus 4M or the remote storage apparatus 4R receives a virtual JVOL addition instruction from the virtual storage management computer 3 (SP600), and first extracts a virtual JNLG # and a virtual VOL # from the virtual JVOL addition instruction (SP601).

The main storage apparatus 4M or the remote storage apparatus 4R next determines whether or not the DP-VOL 101 that is associated with the virtual VOL # extracted in Step SP601 is present in its own casing (SP602). Specifically, the main storage apparatus 4M or the remote storage apparatus 4R refers to the virtual VOL management table 230 to identify an entry in which the virtual VOL #231 matches the virtual VOL # extracted in Step SP601, and determines whether or not the real storage apparatus #232 of the identified entry matches the storage apparatus #290.

When the result of this determination is positive (SP602: YES), the main storage apparatus 4M or the remote storage apparatus 4R proceeds to Step SP603 to select one M-JNLG 112M or one R-JNLG 112R that is associated with the virtual JNLG # extracted in Step SP601 and that is present in its own casing.

Specifically, the main storage apparatus 4M or the remote storage apparatus 4R refers to the virtual JNLG management table 820 to identify an entry in which the virtual JNLG #821 matches the virtual JNLG # extracted in Step SP601, and selects one sub-entry in the identified entry where the real storage apparatus #822 matches the real storage apparatus #290.

The main storage apparatus 4M or the remote storage apparatus 4R next adds the DP-VOL 101 that is associated with the virtual VOL # extracted in Step SP601 to the M-JNLG 112M or the R-JNLG 112R that is associated with the real JNLG #823 of the sub-entry selected in Step SP603 (SP604).

Specifically, the main storage apparatus 4M or the remote storage apparatus 4R refers to the virtual VOL management table 230 to identify an entry in which the virtual VOL #231 matches the virtual VOL # extracted in Step SP601, and extracts the real VOL #233 from the identified entry.

The main storage apparatus 4M or the remote storage apparatus 4R then updates the journal group configuration management table 800 by adding the extracted VOL #233 to an entry in which the real JNLG #801 matches the real JNLG #823 of the sub-entry selected in Step SP603.

Lastly, the main storage apparatus 4M or the remote storage apparatus 4R transmits a virtual JVOL addition completion notification to the virtual storage management computer 3 (SP605), and ends the virtual JVOL adding processing A.

In the case where the result of the determination of Step SP602 is negative (SP602: NO), on the other hand, the main storage apparatus 4M or the remote storage apparatus 4R proceeds to Step SP606 to transfer the virtual JVOL addition instruction to the main storage apparatus 4M or the remote storage apparatus 4R where the DP-VOL 101 that is associated with the virtual VOL # extracted in Step SP601 is located. Specifically, the main storage apparatus 4M or the remote storage apparatus 4R transfers the virtual JVOL addition instruction to the main storage apparatus 4M or the remote storage apparatus 4R that is associated with the real storage apparatus #232 of the entry identified in Step SP602.

The main storage apparatus 4M or the remote storage apparatus 4R to which the virtual JVOL addition instruction has been transferred executes Steps SP600 to SP605. In Step SP600, however, the main storage apparatus 4M or the remote storage apparatus 4R to which the virtual JVOL addition instruction has been transferred receives a virtual JVOL addition instruction from another storage apparatus 4, instead of from the virtual storage management computer 3.

In addition, the main storage apparatus 4M or the remote storage apparatus 4R to which the virtual JVOL addition instruction has been transferred always obtains a positive result in the determination of Step SP602. Further, in Step SP605, the main storage apparatus 4M or the remote storage apparatus 4R to which the virtual JVOL addition instruction has been transferred transmits a virtual JVOL addition completion notification to the main storage apparatus 4M or the remote storage apparatus 4R that has transferred the virtual JVOL addition instruction, instead of to the virtual storage management computer 3.

The main storage apparatus 4M or the remote storage apparatus 4R that has transferred the virtual JVOL addition instruction receives the virtual JVOL addition completion notification from the main storage apparatus 4M or the remote storage apparatus 4R to which the virtual JVOL addition instruction has been transferred (SP607), and proceeds to Step SP605.

The flow described above makes it possible to construct within the same storage apparatus 4 a real JNLG that is associated with a virtual JNLG to which a virtual JVOL is to be added and a real JVOL that is associated with the virtual JVOL to be added, thereby avoiding the lowering of processing efficiency that is caused by communication between one storage apparatus 4 and another.

(3-3) Remote Copy Pair Constructing Processing in this Embodiment

Remote copy pair constructing processing executed in the computer system 1 is described below. In the following description, letters "SP" prefixed to a reference numeral mean "processing step".

Figure 27:
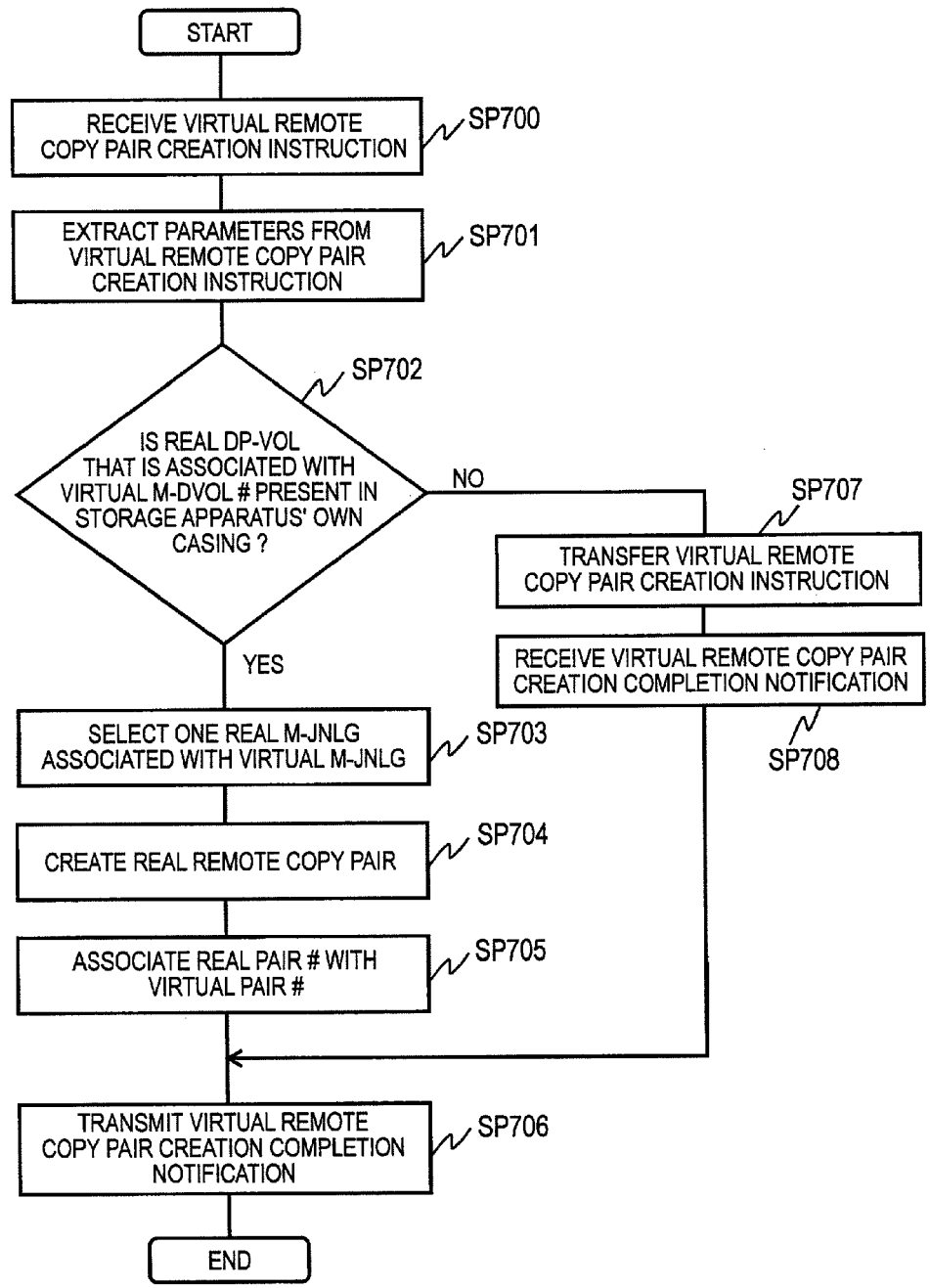
FIG. 27 is a flow chart illustrating steps of remote copy pair creating processing of the storage apparatus in the third embodiment.

FIG. 27 is a flow chart illustrating processing that is executed by one of the main storage apparatus 4M that receives a virtual remote copy pair creation instruction from the virtual storage management computer 3 (hereinafter referred to as virtual remote copy pair creating processing A). The virtual remote copy pair creating processing A is implemented by the CPU 40 of the main storage apparatus 4M by executing a program.

The main storage apparatus 4M receives a virtual remote copy pair creation instruction from the virtual storage management computer 3 (SP700), and first extracts parameters from the virtual remote copy pair creation instruction (SP701). Specifically, the main storage apparatus 4M extracts a virtual pair #, a virtual M-DVOL #, a virtual M-JNLG #, a remote storage apparatus #, an R-DVOL #, and an R-JNLG # from the virtual remote copy pair creation instruction.

The main storage apparatus 4M next determines whether or not the DP-VOL 101 that is associated with the virtual M-DVOL # extracted in Step SP701 is present in its own casing (SP702). Specifically, the main storage apparatus 4M refers to the virtual VOL management table 230 to identify an entry in which the virtual VOL #231 matches the virtual M-DVOL # extracted in Step SP701, and determines whether or not the real storage apparatus #232 of the identified entry matches the storage apparatus #290.

When the result of this determination is positive (SP702: YES), the main storage apparatus 4M proceeds to Step SP703 to select one M-JLNG 112M that is associated with the virtual M-JNLG # extracted in Step SP701. Specifically, the main storage apparatus 4M refers to the virtual journal group configuration management table 820 to identify an entry in which the virtual JNLG #821 matches the virtual M-JNLG # extracted in Step SP701, and selects one sub-entry in the identified entry where the same value as the storage apparatus #290 is set to the real storage apparatus #822.

The main storage apparatus 4M next creates a real remote copy pair (SP704). Specifically, the main storage apparatus 4M adds one entry to the remote copy pair configuration management table 810. In the added entry, an unused number is set to the real pair #811, and a real VOL # of the entry identified in Step SP702 is set to the real M-DVOL #812.

The real JNLG #823 of the sub-entry selected in Step SP703 is set to the real M-JNLG #813. The remote storage apparatus #, the R-DVOL #, and the R-JNLG # that have been extracted in Step SP701 are set to the remote storage apparatus #814, the R-DVOL #815, and the R-JNLG #816, respectively. A value "PAIR" is set to the pair state 817.

The main storage apparatus 4M next associates the real remote copy pair created in Step SP704 with the virtual pair # extracted in Step SP701 (SP705). Specifically, the main storage apparatus 4M adds one entry to the virtual remote copy pair management table 830. In the added entry, the virtual pair # extracted in Step SP701 is set to the virtual pair #831, the storage apparatus #290 is set to the real storage apparatus #832, and the number set to the real pair #811 in Step SP704 is set to the real pair #833.

Lastly, the main storage apparatus 4M transmits a virtual remote copy pair creation completion notification to the virtual storage management computer 3 (SP706), and ends the virtual remote copy pair creating processing A.

In the case where the result of the determination of Step SP702 is negative (SP702: NO), on the other hand, the main storage apparatus 4M proceeds to Step SP707 to transfer the virtual remote copy pair creation instruction to the main storage apparatus 4M where the DP-VOL 101 that is associated with the virtual M-DVOL # extracted in Step SP701 is located. Specifically, the main storage apparatus 4M transfers the virtual remote copy pair creation instruction to the main storage apparatus 4M that is associated with the real storage apparatus #232 of the entry identified in Step SP702.

The main storage apparatus 4M to which the virtual remote copy pair creation instruction has been transferred executes Steps SP700 to SP706. In Step SP700, however, the main storage apparatus 4M to which the virtual remote copy pair creation instruction has been transferred receives a virtual remote copy pair creation instruction from the main storage apparatus 4M that has transferred the virtual remote copy pair creation instruction, instead of from the virtual storage management computer 3.

In addition, the main storage apparatus 4M to which the virtual remote copy pair creation instruction has been transferred always obtains a positive result in the determination of Step SP702. Further, in Step SP706, the main storage apparatus 4M to which the virtual remote copy pair creation instruction has been transferred transmits a virtual remote copy pair creation completion notification to the main storage apparatus 4M that has transferred the virtual remote copy pair creation instruction, instead of to the virtual storage management computer 3.

The main storage apparatus 4M that has transferred the virtual remote copy pair creation instruction receives the virtual remote copy pair creation completion notification from the main storage apparatus 4M to which the virtual remote copy pair creation instruction has been transferred (SP708), and proceeds to Step SP706.

The flow described above makes it possible to construct within the same storage apparatus 4 a real JNLG and a real M-DVOL that are respectively associated with a virtual JNLG and a virtual M-DVOL that are used to create a virtual remote copy pair, thereby avoiding the lowering of processing efficiency that is caused by communication between one storage apparatus 4 and another.

(3-3) the Configuration and Processing for the Case where the Management Computer Takes Initiative The journal group constructing processing and the remote copy pair constructing processing in which the relevant storage apparatus 4 takes a central role in the description given above may be initiated and conducted by the management computer 8. This lessens the load on the storage apparatus 4.

In the case where the management computer 8 initiates and conducts the processing, the management computer 8 holds the virtual VOL management table 230, the virtual journal group management table 820, and the virtual remote copy pair management table 830 in the memory 81, and keeps the tables consistent with the virtual VOL management table 230, the virtual journal group management table 820, and the virtual remote copy pair management table 830 that each storage apparatus 4 holds in the memory 41.

Figure 28:
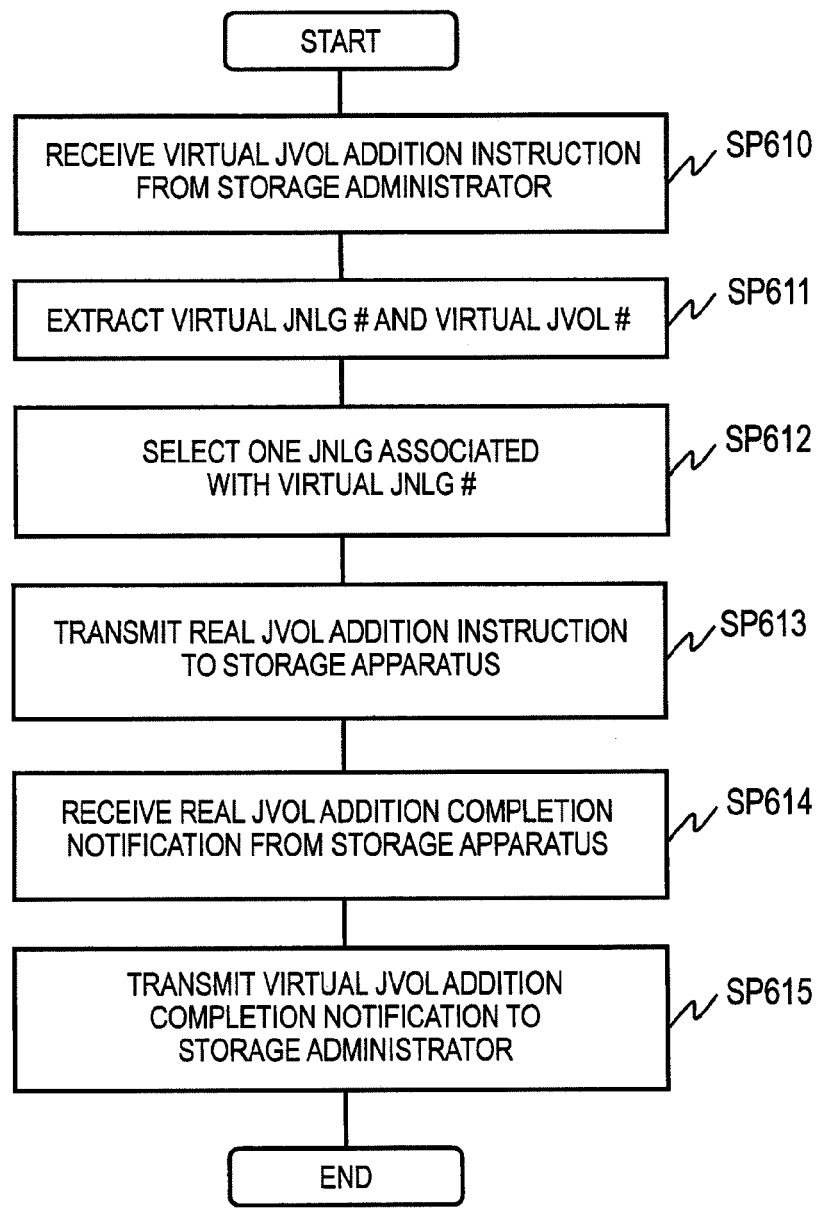
FIG. 28 is a flow chart illustrating steps of JVOL adding processing that is initiated and conducted by a management computer in the third embodiment.

FIG. 28 is a flow chart illustrating processing that is executed by the management computer 8 when a virtual JVOL addition instruction is received from the virtual storage administrator (hereinafter referred to as virtual JVOL adding processing B). The virtual JVOL adding processing B is implemented by the CPU 80 of the management computer 8 by executing a program.

The management computer 8 receives a virtual JVOL addition instruction from the virtual storage administrator (SP610), and first extracts a virtual JNLG # and a virtual VOL # from the virtual JVOL addition instruction (SP611).

The management computer 8 next selects one M-JNLG 112M or one R-JNLG 112R that is associated with the virtual JNLG # extracted in Step SP611 and that is present in the same casing (the same storage apparatus) as the DP-VOL 101 that is associated with the virtual JVOL # extracted in Step SP611 (SP612).

Specifically, the management computer 8 refers to the virtual journal group management table 820 of the memory 81 to identify an entry in which the same value as the virtual JNLG # extracted in Step SP611 is set to the virtual JNLG #821. The management computer 8 also refers to the virtual VOL management table 230 of the memory 81 to identify an entry in which the same value as the virtual VOL # extracted in Step SP611 is set to the virtual VOL #231, and extracts the real storage apparatus #232 from the identified entry.

The management computer 8 then selects one sub-entry in the identified entry of the virtual journal group management table 820 where the same value as the extracted real storage apparatus #232 is set to the real storage apparatus #822.

The management computer 8 next transmits a real JVOL addition instruction to the main storage apparatus 4M or the remote storage apparatus 4R where the M-JNLG 112M or the R-JNLG 112R that has been selected in Step SP612 is located (SP613). Specifically, the management computer 8 transmits a real JVOL addition instruction to the main storage apparatus 4M or the remote storage apparatus 4R that is associated with the real storage apparatus #822 of the sub-entry selected in Step SP612. In transmitting the instruction, the management computer 8 includes in the real JVOL addition instruction the real JNLG #823 of the sub-entry selected in Step SP612 and the real VOL #233 of the entry of the virtual VOL management table 230 that has been identified in Step SP612.

The main storage apparatus 4M or the remote storage apparatus 4R that has received the real JVOL addition instruction adds the specified DP-VOL 101 to the M-JNLG 112M or to the R-JNLG 112R following the real JVOL addition instruction, and transmits a real JVOL addition completion notification to the management computer 8.

The management computer 8 receives the real JVOL addition completion notification from the main storage apparatus 4M or from the remote storage apparatus 4R (SP614), transmits a virtual JVOL addition completion notification to the virtual storage administrator (SP615), and ends the virtual JVOL adding processing B.

In remote copy pair constructing processing, the management computer 8 transmits a virtual remote copy pair creation instruction that specifies a virtual M-JNLG # to the storage apparatus 4 that has a real M-DVOL associated with a specified virtual M-DVOL #. The storage apparatus 4 that has received the instruction associates the specified real M-DVOL with its own real M-DVOL that is associated with the specified virtual M-JNLG #.

Figure 29:
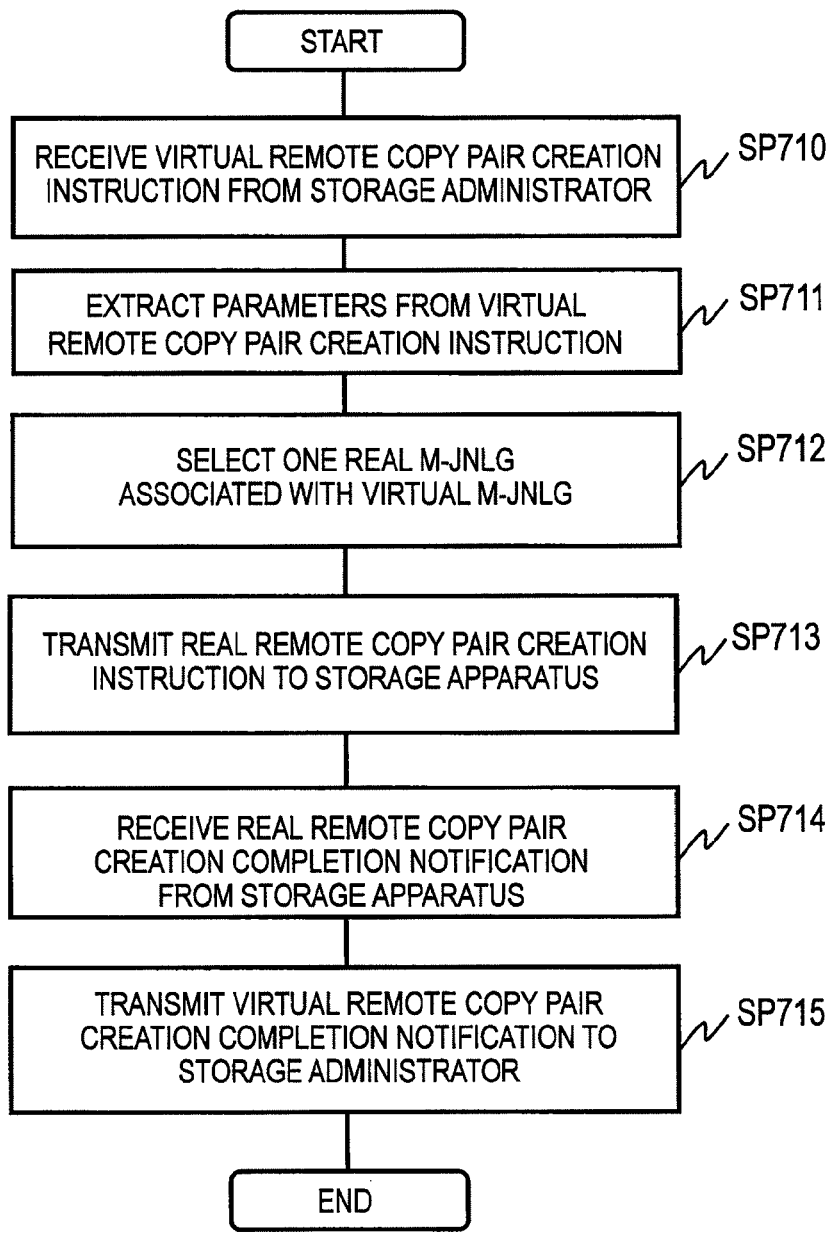
FIG. 29 is a flow chart illustrating steps of remote copy pair creating processing that is initiated and conducted by a management computer in the third embodiment

FIG. 29 is a flow chart illustrating processing that is executed by the management computer 8 when a virtual remote copy pair creation instruction is received from the virtual storage administrator. The processing is implemented by the CPU 80 of the management computer 8 by executing a program.

The management computer 8 receives a virtual remote copy pair creation instruction from the virtual storage administrator (SP710), and first extracts parameters from the virtual remote copy pair creation instruction (SP711). Specifically, the management computer 8 extracts a virtual pair #, a virtual M-DVOL #, a virtual M-JNLG #, a remote storage apparatus #, an R-DVOL #, and an R-JNLG # from the virtual remote copy pair creation instruction.

The management computer 8 next selects one M-JNLG 112M that is associated with the virtual M-JNLG # extracted in Step SP711 and that is present in the same casing as the M-DVOL 101MD that is associated with the virtual M-DVOL # extracted in Step SP711 (SP712).

Specifically, the management computer 8 refers to the virtual journal group management table 820 of the memory 81 to identify an entry in which the same value as the virtual M-JNLG # extracted in Step SP711 is set to the virtual JNLG #821.

The management computer 8 also refers to the virtual VOL management table 230 of the memory 81 to identify an entry in which the same value as the virtual M-DVOL # extracted in Step SP711 is set to the virtual VOL #231, and extracts the real storage apparatus #232 from the identified entry. The management computer 8 then selects one sub-entry in the identified entry of the virtual journal group management table 820 where the same value as the extracted real storage apparatus #232 is set to the real storage apparatus #242.

The management computer 8 next transmits the real remote copy pair creation instruction to the main storage apparatus 4M where the M-JNLG 112M selected in Step SP712 is located (SP713). When transmitting the instruction, the management computer 8 includes, in the remote copy pair creation instruction, the real VOL #233 of the entry of the virtual VOL management table 230 that has been identified in Step SP712, the real JNLG #823 of the entry of the virtual journal group management table 820 that has been identified in Step SP712, and the remote storage apparatus #, the R-DOVL #, and the R-JNLG # extracted in Step SP711.

The main storage apparatus 4M that has received the real remote copy pair creation instruction creates a real remote copy pair following the remote copy pair creation instruction, and transmits a real remote copy pair creation completion notification to the management computer 8.

The management computer 8 receives the remote copy pair creation completion notification from the main storage apparatus 4M (SP714), transmits a remote copy pair creation completion notification to the virtual storage administrator (SP715), and ends the remote copy pair creating processing B.

As has been described, according to this embodiment, a plurality of real storage apparatuses which provide a virtual storage apparatus can be run without the need for being conscious of physical boundaries (real boundaries), and the storage running cost is accordingly reduced. When adding a virtual JVOL to a virtual JNLG or when creating a virtual remote copy pair, a real storage resource associated with the virtual JNLG and a real storage resource associated with the virtual JVOL, or a real storage resource associated with the virtual JNLG and a real storage resource associated with the virtual M-DVOL, can be constructed within a single storage apparatus, and the processing efficiency in the virtual storage apparatus is thus prevented from dropping.

The processing described above that relates to virtual remote copy pairs is applicable to a storage system that does not use pools.

Embodiments of this invention have now been described. However, this invention is not limited to the embodiments described above, and it would be easy for those skilled in the art to modify, add, or convert elements of the embodiments described above within the scope of this invention. For instance, a system or an apparatus to which this invention is applied can have only a part of the configurations of the plurality of embodiments described above, or can include all components of the plurality of embodiments described above. This invention allows for substituting some elements of the configuration of one embodiment with elements of another embodiment, and allows for adding a part of the configuration of one embodiment to another embodiment.

The configurations, functions, processing modules, processing units, and the like described above may partially or entirely be implemented by hardware by, for example, designing in the form of an integrated circuit. Information such as programs, tables, and files for implementing the respective functions can be stored in a storage device such as a non-volatile semiconductor memory, a hard disk drive, or a solid state drive, or in a computer-readable, non-transitory data storage medium such as an IC Card, an SD card, or a DVD.

The invention claimed is:

1. A storage system for providing a virtual storage apparatus that comprises a plurality of virtual storage resources associated with a plurality of real storage resources of a plurality of real storage apparatuses, wherein the plurality of real storage apparatuses include a first real storage apparatus and a second real storage apparatus, wherein the first real storage apparatus receives a virtual storage resource control command of a predetermined type which specifies a first virtual storage resource in the virtual storage apparatus and a second virtual storage resource associated with the first virtual storage resource, wherein the first real storage apparatus refers to management information for managing association relations between the plurality of virtual storage resources and the plurality of real storage resources, to identify a first real storage resource which is associated with the first virtual storage resource and one of the plurality of real storage apparatuses that comprises the first real storage resource, wherein, when the one of the plurality of real storage apparatuses that comprises the first real storage resource is the first real storage apparatus, the first real storage apparatus performs one of selecting a second real storage resource which is associated with the second virtual storage resource from real storage resources that belong to the first real storage apparatus, and creating the second real storage resource, and wherein, when the one of the plurality of real storage apparatuses that comprises the first real storage resource is the second real storage apparatus, the second real storage apparatus performs one of selecting the second real storage resource from real storage resources that belong to the second real storage apparatus, and creating the second real storage resource following an instruction from the first real storage apparatus, wherein the first virtual storage resource is a virtual primary volume, wherein the second virtual storage resource is a virtual secondary volume which forms a virtual local copy pair with the virtual primary volume, wherein the virtual storage resource control command instructs to create the virtual local copy pair with the virtual primary volume and the virtual secondary volume specified, wherein the first real storage resource is a first real volume which is associated with the virtual primary volume in the management information, wherein, when one of the plurality of real storage apparatuses that comprises the first real volume is the first real storage apparatus, and one of the plurality of real storage apparatus that comprises a real volume associated with the virtual secondary volume in the management information is a storage apparatus that is not the first real storage apparatus, the first real storage apparatus creates a new real volume which is associated with the virtual secondary volume, and wherein, when the one of the plurality of real storage apparatuses that comprises the first real volume is the second real storage apparatus, and the one of the plurality of real storage apparatuses that comprises the real volume associated with the virtual secondary volume in the management information is a storage apparatus that is not the second real storage apparatus, the second real storage apparatus creates a new real volume that is associated with the virtual secondary volume, following the instruction from the first real storage apparatus.

2. The storage system according to claim 1, wherein the first real storage apparatus selects, from among at least one real journal group that is associated with the virtual journal group, a first real journal group of the first real storage apparatus as a real journal group for storing update data of the first real volume, and wherein the second real storage apparatus selects, following the instruction from the first real storage apparatus, from among the at least one real journal group that is associated with the virtual journal group, a first real journal group of the second real storage apparatus as a real journal group for storing the update data of the first real volume.

3. The storage system according to claim 2, wherein the first real storage apparatus selects, from among at least one real journal group that is associated with a virtual journal group, a first real journal group of the first real storage apparatus as a real journal group to which the first real volume is added, and wherein storing the update data of the first real volume includes adding to the first real volume.

4. A method of controlling a storage system for providing a virtual storage apparatus that comprises a plurality of virtual storage resources associated with a plurality of real storage resources of a plurality of real storage apparatuses, the method comprising: receiving a virtual storage resource control command of a predetermined type which specifies a first virtual storage resource in the virtual storage apparatus and a second virtual storage resource associated with the first virtual storage resource: referring to management information for managing association relations between the plurality of virtual storage resources and the plurality of real storage resources, to identify a first real storage resource which is associated with the first virtual storage resource and a first real storage apparatus which comprises the first real storage resource; and performing one of selecting a second real storage resource which is associated with the second virtual storage resource from real storage resources that are within the first real storage apparatus, and creating the second real storage resource within the first real storage apparatus, wherein the first virtual storage resource is a virtual primary volume, wherein the second virtual storage resource is a virtual secondary volume which forms a virtual local copy pair with the virtual primary volume, wherein the virtual storage resource control command instructs to create the virtual local copy pair with the virtual primary volume and the virtual secondary volume specified, wherein the first real storage resource is a first real volume which is associated with the virtual primary volume in the management information, and wherein, when one of the plurality of real storage apparatuses that comprises a real volume associated with the virtual secondary volume in the management information is a storage apparatus that is different from the first real storage apparatus, a second real volume which is associated with the virtual secondary volume is created within the first real storage apparatus.

5. The method according to claim 4, wherein the second virtual storage resource virtual secondary volume is a virtual journal group that comprises at least one virtual journal volume and that stores update data of the virtual main volume before transferring the update data to the virtual main volume.

6. The method according to claim 4, wherein the second virtual storage resource is a virtual storage pool to which the first virtual primary volume is added, wherein the virtual storage resource control command instructs to add the first virtual volume to the virtual storage pool, and wherein, from among at least one real storage pool that is associated with the virtual storage pool, a first real storage pool of the first real storage apparatus is selected as a real storage pool to which the first real volume is added.

7. A management system which manages a storage system for providing a virtual storage apparatus that comprises a plurality of virtual storage resources associated with a plurality of real storage resources of a plurality of real storage apparatuses, the management system comprising:
   an interface;
   a processor; and
   a memory,
   wherein the processor obtains, via the interface, a virtual storage resource control command of a predetermined type which specifies a first virtual storage resource in the virtual storage apparatus and a second virtual storage resource associated with the first virtual storage resource, wherein the memory stores management information for managing association relations between the plurality of virtual storage resources and the plurality of real storage resources, wherein the processor refers to the management information to identify a first real storage resource which is associated with the first virtual storage resource and a first real storage apparatus that comprises the first real storage resource, and wherein the processor instructs the first real storage apparatus to perform one of selecting a second real storage resource which is associated with the second virtual storage resource from real storage resources that belong to the first real storage apparatus, and creating the second real storage resource, wherein the first virtual storage resource is a virtual primary volume, wherein the second virtual storage resource is a virtual secondary volume which forms a virtual local copy pair with the virtual primary volume, wherein the virtual storage resource control command instructs to create the virtual local copy pair with the virtual primary volume and the virtual secondary volume specified, wherein the first real storage resource is a first real volume which is associated with the virtual primary volume in the management information, wherein, when one of the plurality of real storage apparatuses that comprises the first real volume is the first real storage apparatus, and one of the plurality of real storage apparatuses that comprises a real volume associated with the virtual secondary volume in the management information is a storage apparatus that is not the first real storage apparatus, the first real storage apparatus creates a new real volume which is associated with the virtual secondary volume, and wherein, when the one of the plurality of real storage apparatuses that comprises the first real volume is the second real storage apparatus, and the one of the plurality of real storage apparatuses that comprises the real volume associated with the virtual secondary volume in the management information is a storage apparatus that is not the second real storage apparatus, the second real storage apparatus creates a new real volume that is associated with the virtual secondary volume, following the instruction from the first real storage apparatus.

\* \* \* \* \*